US012710545B2

(12) United States Patent
Lawson et al.

(10) Patent No.: US 12,710,545 B2
(45) Date of Patent: Aug. 18, 2026

(54) PERCEPTION FOR POINT CLOUDS

(71) Applicant: Five AI Limited, Cambridge (GB)

(72) Inventors: Andrew Lawson, Cambridge (GB); David Pickup, Cambridge (GB); Sina Samangooei, Cambridge (GB); John Redford, Cambridge (GB)

(73) Assignee: Five AI Limited, Cambridge (GB)

( * ) Notice: Subject to any disclaimer, the term of this patent is extended or adjusted under 35 U.S.C. 154(b) by 470 days.

(21) Appl. No.: 18/272,832

(22) PCT Filed: Jan. 18, 2022

(86) PCT No.: PCT/EP2022/051048
§ 371 (c)(1),
(2) Date: Jul. 18, 2023

(87) PCT Pub. No.: WO2022/157161
PCT Pub. Date: Jul. 28, 2022

(65) Prior Publication Data
US 2024/0077617 A1 Mar. 7, 2024

(30) Foreign Application Priority Data
Jan. 19, 2021 (GB) ..................................... 2100682

(51) Int. Cl.
*G01S 17/931* (2020.01)
*G06T 7/20* (2017.01)

(52) U.S. Cl.
CPC .............. *G01S 17/931* (2020.01); *G06T 7/20* (2013.01); *G06T 2207/10028* (2013.01)

(58) Field of Classification Search
CPC ...... G01S 13/584; G01S 13/42; G01S 17/931; G01S 7/417; G01S 13/726; G01S 13/582;
(Continued)

(56) References Cited

U.S. PATENT DOCUMENTS 10,365,650 B2 * 7/2019 Rust ........................ G01S 17/58
10,761,201 B2 * 9/2020 Okazaki ................ G01S 13/426
(Continued)

FOREIGN PATENT DOCUMENTS

WO 2020022110 A1 1/2020
WO 2020113160 A2 6/2020

OTHER PUBLICATIONS

International Search Report; PCT/EP2022/051048; Date: May 19, 2022.
(Continued)

*Primary Examiner* — An H Do
(74) *Attorney, Agent, or Firm* — Andrew J. Tibbetts; Greenberg Traurig, LLP

(57) ABSTRACT

A computer-implemented method of computer-implemented method of perceiving structure in a point cloud comprises: applying clustering to the point cloud, and thereby identifying at least one moving object cluster within the point cloud, the point cloud comprising time-stamped points captured over a non-zero accumulation window; determining a motion model for the moving object cluster, by fitting one or more parameters of the motion model to the time-stamped points of that cluster; using the motion model to transform the time-stamped points of the moving object cluster to a common reference time; and applying a perception component to the transformed points of the moving object cluster to extract information about structure exhibited in the transformed points.

20 Claims, 14 Drawing Sheets

(58) Field of Classification Search
CPC ........ G01S 13/52; G01S 13/931; G01S 7/415; G01S 2013/9323; G01S 2013/932; G06T 7/20; G06T 2207/10028
See application file for complete search history.

(56) References Cited

U.S. PATENT DOCUMENTS

| | | | | |
|---|---|---|---|---|
| 11,113,584 | B2 * | 9/2021 | Deng | G01S 17/86 |
| 12,061,262 | B2 * | 8/2024 | Hexsel | G06T 7/248 |

OTHER PUBLICATIONS

Yang Feng et al, "A RANSAC-Based Track Initialization Algorithm for Multi-Sensor Tracking System", 2018 International Conference on Control, Automation and Information Sciences (ICCAIS), IEEE, Oct. 24, 2018 (Oct. 24, 2018), p. 96-101.
Nicolas Scheiner et al, "A Multi-Stage Clustering Framework for Automotive Radar Data", arxiv.org, Cornell University Library, 201 Olin Library Cornell University Ithaca, NY 14853, Jul. 8, 2019 (Jul. 8, 2019).
Schumann Ole et al, "Supervised Clustering for Radar Applications: On the Way to Radar Instance Segmentation", 2018 IEEE MTT-S International Conference on Microwaves for Intelligent Mobility (ICMIM), IEEE, Apr. 15, 2018 (Apr. 15, 2018), p. 1-4.
John Leonard et al, "A perception-driven autonomous urban vehicle", Journal of Field Robotics, vol. 25, No. 10, Oct. 1, 2008 (Oct. 1, 2008), p. 727-774.
Schutz Markus et al, "Simultaneous tracking and shape estimation with laser scanners", Jul. 9, 2013 (Jul. 9, 2013), p. 885-891.
Frank Moosmann et al, "Motion estimation from range images in dynamic outdoor scenes", 2010 IEEE International Conference on Robotics and Automation : ICRA 2010 ; Anchorage, Alaska, USA, May 3-8, 2010, IEEE, Piscataway, NJ, USA, May 3, 2010 (May 3, 2010), p. 142-147, ISBN: 9781424450381.
Yang Bin et al, "PIXOR: Real-time 3D Object Detection from Point Clouds", 2018 IEEE/CVF Conference on Computer Vision and Pattern Recognition, IEEE, Jun. 18, 2018 (Jun. 18, 2018), p. 7652-7660.

* cited by examiner

Birds-eye-view

Simultaneous motion modelling and box fitting

PERCEPTION FOR POINT CLOUDS

CROSS-REFERENCE TO RELATED APPLICATIONS

This application is the U.S. National Stage application, pursuant to 35 U.S.C. § 371, of PCT International Patent Application No. PCT/EP2022/051048, filed Jan. 18, 2022, designating the United States and published in English, which claims priority under 35 U.S.C. §§ 119 and 365 to Great Britain Patent Application No. 2100682.0, filed Jan. 19, 2021. The contents of each of the aforementioned applications are incorporated herein by reference in their entirety.

TECHNICAL FIELD

The present disclosure pertains to perception methods applicable to point clouds, and to computer systems and computer programs for implementing the same.

BACKGROUND

Point clouds can be captured using various sensor modalities, including lidar, radar, stereo depth imaging, monocular depth imaging etc. Point clouds can be 2D or 3D in the sense of having two or three spatial dimensions. Each point can have additional non-spatial dimension(s) such as Doppler velocity or RCS (radar cross section) in radar and reflectivity in lidar.

Autonomous driving systems (ADS) and advanced driver assist systems (ADAS) typically rely on point clouds captured using one or more sensor modalities. When 2D point clouds are used in this context, typically the sensors are arranged to provide birds-eye-view point clouds under normal driving conditions as that tends to be the most relevant view of the world for fully or semi-autonomous driving.

In practice, point clouds present somewhat different challenges for perception than conventional images. Point clouds tend to be sparser than images and, depending on the nature of the point cloud, the points may be unordered and/or non-discretised. Compared with computer vision, machine learning (ML) perception for point clouds is a less developed (but rapidly emerging) field. Much of the focus has been on lidar point clouds as their relatively high density generally makes them more conducive to pattern recognition.

SUMMARY

An issue addressed herein is motion effects exhibited in point clouds that have been accumulated over some non-zero accumulation window. Generally speaking, a higher density point cloud can be obtained by accumulating points over a longer window. However, when the point cloud includes points from moving objects, the longer the accumulation window, the greater the extent of "smearing" effects in the point clouds. Such effects arise because the point cloud includes points captured from a moving object at a series of different locations, making the structure of the moving object much harder to discern in the moving point cloud.

According to a first aspect herein, a computer-implemented method of perceiving structure in a point cloud comprises: applying clustering to the point cloud, and thereby identifying at least one moving object cluster within the point cloud, the point cloud comprising time-stamped points captured over a non-zero accumulation window; determining a motion model for the moving object cluster, by fitting one or more parameters of the motion model to the time-stamped points of that cluster; using the motion model to transform the time-stamped points of the moving object cluster to a common reference time; and applying a perception component to the transformed points of the moving object cluster to extract information about structure exhibited in the transformed points.

The step of transforming the cluster point to the common reference time is termed "unsmearing" herein. Given an object point captured at some other time in the accumulation window, once the object motion is known, it is possible to infer the location of that object point at the common reference time.

The method can be applied to any type of point cloud accumulated over time in order to obtain a denser point cloud with significantly reduced smearing effects. The method is particularly useful when applied to radar point clouds. A challenge with radar is the sparsity of points that are typically produced in a single radar scan compared with point clouds produced using lidar or depth imaging. For example, in a driving context, a radar sweep from a sensor-equipped vehicle (the ego vehicle) might typically detect only a few points on each nearby vehicle. This limits the ability to use state-of-the-art ML techniques for radar because the points captured in a radar scan will generally be too sparse to exhibit patterns that ML models can be trained to recognize reliably. By accumulating radar points over a sufficient window and unsmearing moving object points using the above method, it is possible to obtain much denser sets of radar points—sufficiently dense that the application of machine learning perception components (e.g., state-of-the art convolutional neural networks of the kind used to process lidar or RGBD point clouds) becomes viable.

In embodiments, the clustering may identify multiple moving object clusters, and a motion model may be determined for each of the multiple moving object clusters and used to transform the timestamped points of that cluster to the common reference time.

In embodiments of the preceding paragraph, the perception component may be applied to a transformed point cloud comprising the transformed points of the multiple object clusters to extract information about structure exhibited in the transformed point cloud.

The transformed point cloud may additionally comprise untransformed static object points of the point cloud.

The clustering may be based on the timestamps, with points assigned to (each of) the moving object cluster(s) based on similarity of their timestamps. In other words, clustering may be performed over the time dimension explicitly.

For example, the clustering may be density-based and use a time threshold to determine whether or not to assign a point to the moving object cluster, where the point may be assigned to the moving object cluster only if a difference between its timestamp and the timestamp of another point assigned to the moving object cluster is less than the time threshold.

Each point may have a velocity component, and the clustering may be based on the velocity components, with points assigned to (each of) the moving object cluster(s) based on similarity of their velocity components. In other words, clustering may be performed over the velocity dimension.

For example, the clustering may be density-based and use a velocity threshold to determine whether or not to assign a point to the moving object cluster, where the point may be assigned to the moving object cluster only if a difference between its velocity component and the velocity component of another point assigned to the moving object cluster is less than the velocity threshold.

The point cloud may be a radar point cloud, and the velocity components may be Doppler components.

The velocity components of the (or each) moving object cluster may be used to determine the motion model for that cluster.

Alternatively, the motion model may be determined from the timestamps and spatial coordinates of the points, without the use of velocity components.

The points of the point cloud may have been captured by a moving sensor system, and ego motion of the sensor system over the accumulation window may be determined and used to accumulate the points in a common static frame of reference prior to clustering.

The ego motion data may be determined via odometry.

The velocity components may be determined by compensating for the ego motion in velocities measured by the moving sensor system.

The perception component may be a machine learning (ML) perception component.

The ML perception component may comprise a bounding box detector or other object detector applied to the transformed point cloud, and the extracted information may comprise object position, orientation and/or size information for at least one detected object.

The ML perception component may be applied to a discretised image representation of the above transformed point cloud.

The discretised image representation may have an occupancy channel indicating whether or not each pixel thereof corresponds to a point in the transformed point cloud.

For point with velocity components (such as radar), the discretised image representation may have at least one velocity channel that encodes, for each pixel corresponding to a point in the transformed point cloud, the velocity component or a transformed velocity component of that point.

Alternatively or additionally, the discretised image representation may have one or more motion channels that encode, for each pixel corresponding to a point of (one of) the moving object cluster(s), motion information about that point derived from the motion model of that moving object cluster.

A second aspect herein provides a computer-implemented method of detecting object motion in a point cloud, the method comprising: applying clustering to the point cloud, and thereby identifying at least one moving object cluster within the point cloud, the point cloud comprising time-stamped points captured over a non-zero accumulation window; and determining a motion model for the moving object cluster, by fitting one or more parameters of the motion model to the time-stamped points of that cluster.

In embodiments of the first or second aspects, the point cloud may be a radar point cloud, each point may have a measured Doppler component, and the measured Doppler components may be used to determine the motion model.

For example, the parameters of the motion model may comprise linear and angular velocity parameters defining predicted linear and angular velocity of an object in 2D or 3D space. For each point of the moving object cluster, a predicted Doppler component may be determined from the motion model based on the predicted linear and angular velocity of the object, the linear and angular velocity parameters fitted by comparing the predicted Doppler components with the measured Doppler components.

Optionally, the parameters of the motion model may comprise one or more extent parameters defining an extent of the object, and the predicted Doppler components may be determined from the motion model based on the extent and linear and angular velocity of the object, the extent parameters and linear and angular velocity parameters fitted by comparing the predicted Doppler components with the measured Doppler components.

For example, the extent parameters may be box parameters defining the extent of the object as a 2D or 3D box.

A third aspect herein provides a computer-implemented method of detecting objects in a point cloud, the method comprising: applying clustering to the point cloud, and thereby identifying at least one object cluster within the point cloud, the point cloud comprising time-stamped points captured over a non-zero accumulation window, wherein the clustering is based on the timestamps, with points assigned to the moving object cluster based on similarity of their timestamps.

When accumulating points over time, clustering over the time dimension allows points from objects that might occupy the same space but at different times to be more readily distinguished.

The clustering may be density-based and may use a time threshold to determine whether or not to assign a point to the moving object cluster, wherein the point may be assigned to the moving object cluster only if a difference between its timestamp and the timestamp of another point assigned to the moving object cluster is less than the time threshold.

Each point may have a velocity component, and the clustering may be based on the velocity components, with points assigned to (each of) the moving object cluster(s) based on similarity of their velocity components.

For example, the clustering may be density-based and use a velocity threshold to determine whether or not to assign a point to the moving object cluster, where the point may be assigned to the moving object cluster only if a difference between its velocity component and the velocity component of another point assigned to the moving object cluster is less than the velocity threshold.

The point cloud may be a radar point cloud, and the velocity components may be Doppler components.

In any of the above aspects or embodiments, the perception component may be a machine learning (ML) perception component having a convolutional neural network (CNN) architecture.

Further aspects herein provide a computer system comprising one or more computers configured to implement the method of any aspect or embodiment herein, and a computer program configured so as, when executed on one or more computers, to implement the same.

BRIEF DESCRIPTION OF FIGURES

For a better understanding of the present disclosure, and to show how embodiments of the same may be carried into effect, reference is made by way of example only to the following figures in which.

DETAILED DESCRIPTION

Figure 1:
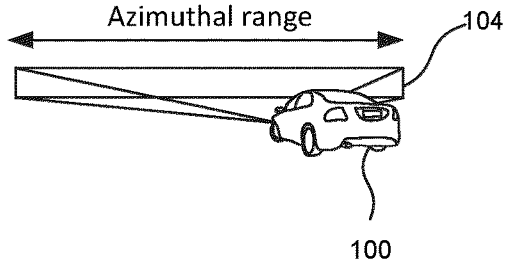
FIG. 1 shows a schematic perspective view of a vehicle equipped with a 2D radar system.

As discussed, it may be desirable to accumulate detected points over some non-zero window in order to obtain a denser accumulated point cloud. Techniques are described herein that can be applied in this context in order to compensate for smearing effects caused by object motion over the accumulation window.

The examples below focus on radar. As discussed, sparseness is a particular problem in radar. By applying the present techniques to radar, embodiments of the present technology can facilitate sophisticated radar-based perception, on a par with state-of-the art image or lidar-based perception. Whilst there are particular benefits in the context of radar, it is noted that the present techniques can be applied to point clouds of any modality (or modalities) that are accumulated over time. The application to other point cloud modalities is described in more detail below.

Herein, the term "perception" refers generally to methods for detecting structure in point clouds, for example by recognizing patterns exhibited in point clouds. State-of-the-art perception methods are typically ML-based, and many state-of-the art perception method use deep convolutional neural networks (CNNs). Pattern recognition has a wide range of applications including object detection/localization, object/scene recognition/classification, instance segmentation etc.

Object detection and object localization are used interchangeably herein to refer to techniques for locating objects in point clouds in a broad sense; this includes 2D or 3D bounding box detection, but also encompasses the detection of object location and/or object pose (with or without full bounding box detection), and the identification of object clusters. Object detection/localization may or may not additionally classify objects that have been located (for the avoidance of doubt, whilst, in the field of machine leaning, the term "object detection" sometimes implies that bounding boxes are detected and additionally labelled with object classes, the term is used in a broader sense herein that does not necessarily imply object classification or bounding box detection).

Radar uses radio waves to sense objects. A radar system comprises at least one transmitter which emits a radio signal and at least one detector that can detect a reflected radio signal from some location on an object (the return).

Radar systems have been used in vehicles for many years, initially to provide basic alert functions, and more recently to provide a degree of automation in functions such as park assist or adaptive cruise control (automatically maintaining some target headway to a forward vehicle). These functions are generally implemented using basic proximity sensing, and do not rely on sophisticated object detection or recognition. A basic radar proximity sensor measures distance to some external object (range) based on radar return time (the time interval between the emission of the radar signal and the time at which the return is received).

Radar can also be used to measure object velocity via Doppler shift. When a radar signal is reflected from a moving object (moving relative to the radar system), the Doppler effect causes a measurable wavelength shift in the return. The Doppler shift can, in turn, be used to estimate a radial velocity of the object (its velocity component in the direction from the radar system to the object). Doppler radar technology has been deployed, for example, in "speed guns" used in law enforcement.

ADS and ADAS require more advanced sensor systems that can provide richer forms of sensor data. Developments have generally leveraged other sensor modalities such as high-resolution imaging and lidar, with state-of-the-art machine learning (ML) perception models used to interpret the sensor data, such as deep convolutional neural networks trained to perform various perception tasks of the kind described above.

State-of-the-art radar systems can provide relatively high-resolution sensor data. However, even with state-of-the-art radar technology, a limitation of radar is the sparsity of radar points, compared with image or lidar modalities. In the examples that follow, this is addressed by accumulating radar points over some appropriate time interval (the accumulation window e.g., of the order of one second), in order to obtain a relatively dense accumulated radar point cloud.

For radar data captured from a moving system, such as a radar-equipped vehicle (the ego vehicle), odometry is used to measure and track motion of the system (ego motion). This allows the effects of ego motion in the radar returns to be compensated for, resulting in a set of accumulated, ego motion-compensated radar points. In the following examples, this is achieved by accumulating the radar points in a stationary frame of reference that coincides with a current location of the ego vehicle (see the description accompanying FIGS. 3A and 3B for further details).

In the following examples, each ego motion-compensated radar point is a tuple $(r_k, v_k, t_k)$ where $r_k$ represents spatial coordinates in the static frame of reference (the spatial dimensions, which could be 2D or 3D depending on the configuration of the radar system), $v_k$ is an ego motion-compensated Doppler velocity (Doppler dimension), and $t_k$ is a timestamp (time dimension).

For conciseness, the term "point" may be used both to refer to a tuple of radar measurements ($r_k$, $v_k$, $t_k$) and to a point k on an object from which those measurements have been obtained. With this notation, $r_k$ and $v_k$ are the spatial coordinates and Doppler velocity of the point k on the object as measured at time $t_k$.

When radar points from a moving object are accumulated over time, those points will be "smeared" by the motion of the object over the accumulation window. In order to "unsmear" moving object points, clustering is applied to the accumulated radar points, in order to identify a set of moving object clusters. The clustering is applied not only to the spatial dimensions but also to the Doppler and time dimensions of the radar point cloud. A motion model is then fitted to each object cluster under the assumption that all points in a moving object cluster belong to a single moving object. Once the motion model has been determined then, given a set of radar measurements ($r_k$, $v_k$, $t_k$) belonging to a particular cluster, the motion model of that cluster can be used to infer spatial coordinates, denoted $s_k$, of the corresponding point k on the object at some reference time $T_0$ (unsmearing). This is possible because any change in the location of the object between $t_k$ and $T_0$ is known from the motion model. This is done for the points of each moving object cluster to transform those points a single time instant (the reference time) in accordance with that cluster's motion model. The result is a transformed (unsmeared) point cloud. The transformed spatial coordinates $s_k$ may be referred to as a point of the transformed point cloud.

The Doppler shift as originally measured by the radar system is indicative of object velocity in a frame of reference of the radar system; if the radar system is moving, returns from static objects will exhibit a non-zero Doppler shift. However, with sufficiently accurate odometry, the ego motion-compensated Doppler velocity $v_k$ will be substantially zero for any static object but non-zero for any moving object point (here, static/moving refer to motion in the world). Moving object points (of vehicles, pedestrians, cyclists, animals etc.) can, therefore, be more readily separated from static "background" points (such as points on the road, road signage and other static structure in the driving environment) based on their respective ego motion-compensated Doppler measurements. This occurs as part of the clustering performed over the Doppler dimension of the radar point cloud.

When radar points are accumulated, points from different objects can coincide in space in the event that two moving objects occupy the same space but at different times. Clustering across the time dimension $t_k$ helps to ensure that points that coincide in space but not in time are assigned to different moving object clusters and, therefore, treated as belonging to separate objects in the motion modelling.

In the following examples, this unsmeared point cloud is a relatively dense radar point cloud made up of the accumulated static object points and the accumulated and unsmeared moving object points from all moving object clusters (full unsmeared point cloud). The full unsmeared point cloud more closely resembles a typical lidar or RGBD point cloud, with static and moving object shapes/patterns now discernible in the structure of the point cloud. This, in turn, means that state of the art perception components (such CNNs) or other ML models can be usefully applied to the dense radar point cloud, e.g., in order to detect 2D or 3D bounding boxes (depending on whether the radar system provides 2D or 3D spatial coordinates).

The method summarized above has two distinct stages. Once ego motion has been compensated for, the first stage uses clustering and motion modelling to compensate for the effects of object motion in the accumulated radar points. In the described examples, this uses "classical" physics motion models based on a small number of physical variables (e.g., object speed, heading etc.) but any form of motion model can be used to compute a moving object trajectory for each moving object cluster (including ML-based motion models). The second stage then applies ML object recognition to the full unsmeared point cloud.

The second stage is optional, as the result of the first stage is a useful output in and of itself: at the end of the first stage, moving objects have been separated from the static background and from each other, and their motion has been modelled. The output of the first stage can, therefore, feed directly into higher level processing such as prediction/planning in an ADS or ADAS, or offline functions such as mapping, data annotation etc. For example, a position of each cluster could be provided as an object detection result together with motion information (e.g., speed, acceleration etc.) of the cluster as determined via the motion modelling, without requiring the second stage.

As extension of the first stage is also described below, in which clusters are identified and boxes are fitted to those clusters simultaneously in the first stage (see FIGS. 10A and 10B and the accompanying description below). In that case, the boxes fitted in the first stage could be provided as object detection outputs, without requiring the second stage.

Nevertheless, the second stage is very a useful refinement of the first stage that can improve overall performance. For example, if the first stage identifies clusters but does not fit boxes to clusters, ML-object detection/localization methods can be used to provide additional information (such as bounding boxes, object poses or locations etc.) with high accuracy. Moreover, even if boxes are fitted in the first stage, ML processing in the second stage may still be able to provide more accurate object detection/localization than the first stage.

Another issue is that the clustering of the first stage might result in multiple clusters being identified for the same moving object. For example, this could occur if the object were occluded for part of the accumulation window. If the results of the first stage were relied upon directly, this would result in duplicate object detections. However, this issue will not necessarily be materially detrimental to the unsmearing process. As noted above, the second stage recognizes objects based on patterns exhibited in the full unsmeared point cloud; provided the moving object points have been adequately unsmeared, it does not matter if they were clustered "incorrectly" in the first stage, as this will not impact on the second stage processing. Hence, the second stage provides robustness to incorrect clustering in the first stage, because the second stage processing is typically more to effects such as object occlusion.

Radar Overview

FIG. 1 shows a perspective view sensor-equipped vehicle 100 (the ego vehicle). The ego vehicle 100 is equipped with a radar system that can detect radar returns within a radar field of view 104. FIG. 1 depicts a 2D radar system that can measure azimuth and range but not elevation. Radar returns map to 2D points in a bird's-eye-view (BEV) plane (FIGS.

2A and 2B, 500). The described techniques can, however, be extended to 3D space if the radar system additionally measures elevation.

Figure 2A:
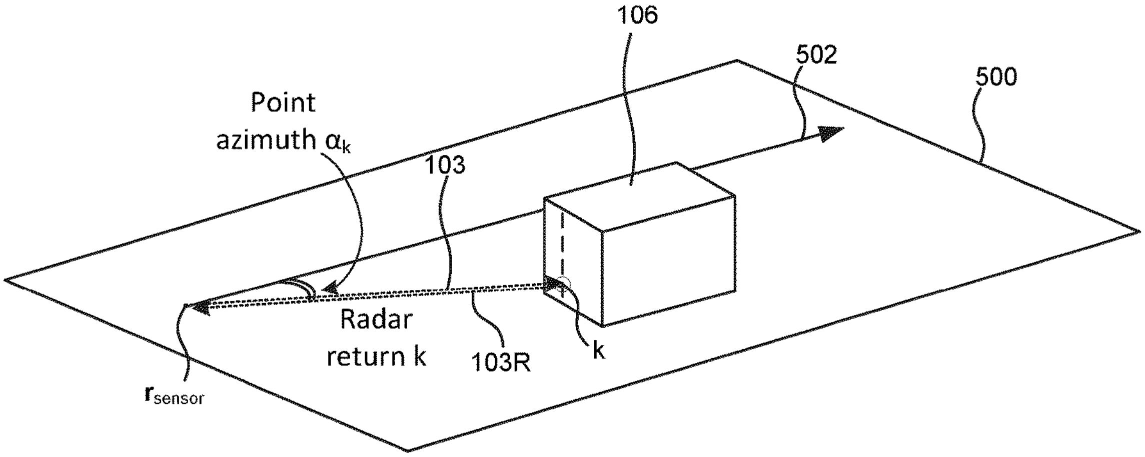
FIGS. 2A and 2B show schematic perspective and bird's-eye-views, respectively, of a radar return generated from an object.
Figure 2B:
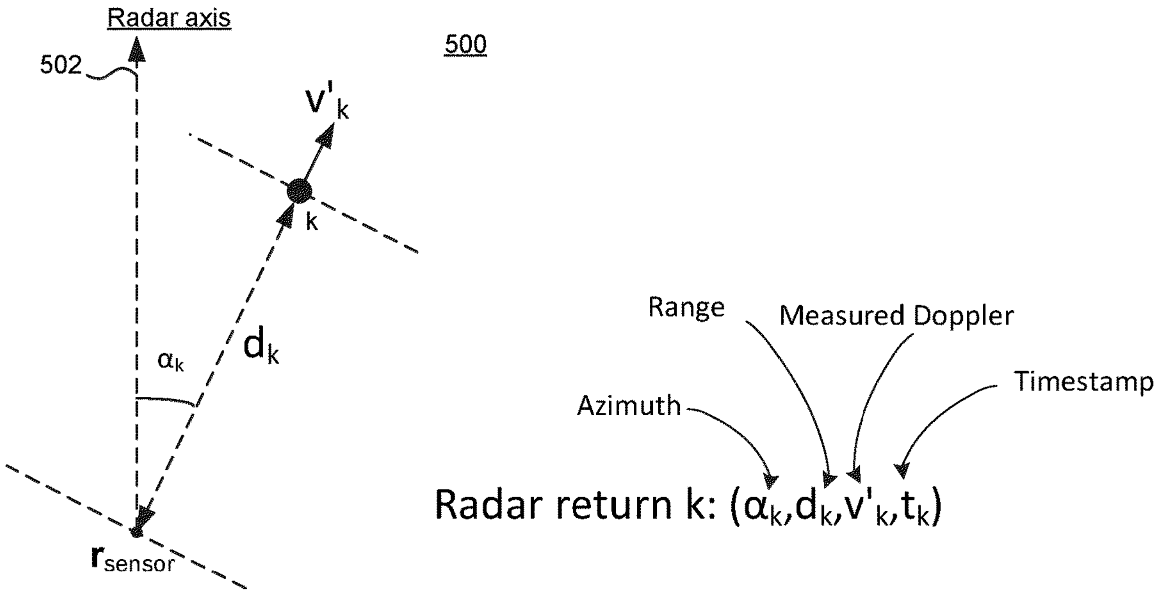

FIGS. 2A and 2B show, respectively, a perspective view and bird's-eye-view (BEV) of a radar return from an object 106 within the radar field of view 104. A radar signal 103 is emitted from a sensor location $r_{sensor}$, propagating in a known direction having azimuth $\alpha_k$. The radar signal 103 propagates towards the object 106 and is shown to be reflected from a point k on the object 106, generating a return 103R back towards the sensor location $r_{sensor}$ that is detectable by the radar system. A range $d_k$ of the point k can be determined from the return time (between the transmit time of the radar signal 103 and the receive time of the detected return 103R). The range $d_k$ is an estimate of the distance between the sensor location $r_{sensor}$ and the point k at time $t_k$. From the detected return 103R, it is possible to infer the presence of the point k having angular coordinates ($\alpha_k$, $d_k$) at time $t_k$.

Physical characteristics of the detected return 103R can be used to infer information about the object point k from which the return 106R was generated. In particular, the radar system measures a Doppler shift and a return time of the return 103R. The Doppler effect is a wavelength shift caused by reflection from an object point k that is moving relative to the radar system. From the Doppler shift, it is possible to estimate a radial velocity $v'_k$ of the point k when the return 103R was generated, i.e., the velocity component in the direction defined by the point azimuth $\alpha_k$. For conciseness, the radial velocity $v'_k$ may be referred to as the Doppler. The primed notation $v'_k$ indicates a "raw" Doppler velocity measured in the (potentially moving) frame of reference of the sensor system at time $t_k$ before the effect of ego motion has been compensated.

Another useful characteristic is the radar cross section (RCS), which is a measure of the extent of detectability of the object point k, measured in terms of the strength of the return 103R in relation to the original signal 103.

The tuple ($\alpha_k$, $d_k$, $v'_k$, $t_k$) may be referred to as a radar point, noting that this includes Doppler and time components. Here, $t_k$ is a timestamp of the radar return. In this example, the timestamp $t_k$ does not indicate the return time, it is simply a time index of a sweep in which the return was generated or, more generally, a time index of some timestep in which the return was detected. Typically, multiple returns will be detected per time step, and all of those returns will have the same timestamp (even though they might be received at slightly different times).

Figures 3A, 3B:
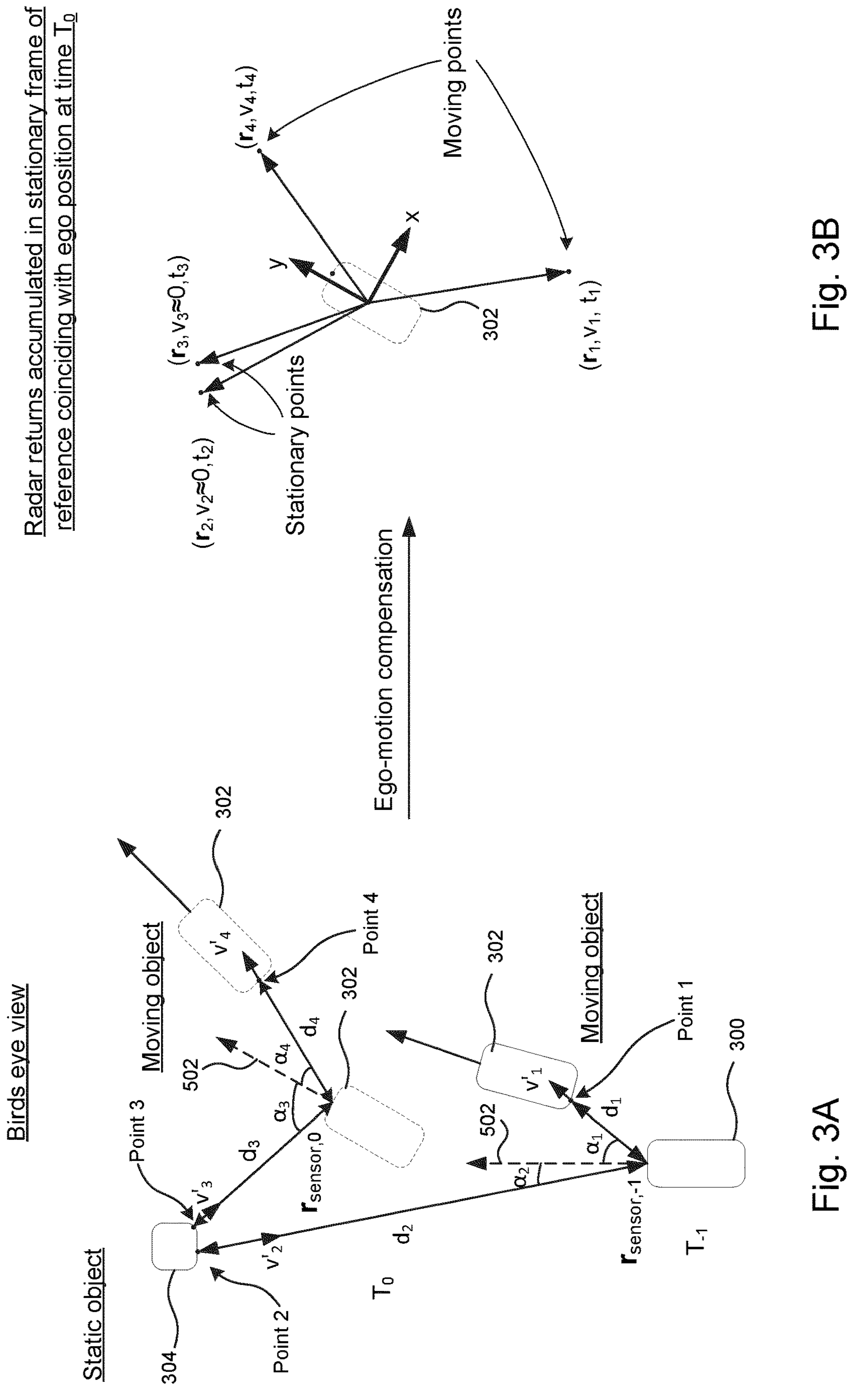
FIG. 3A shows a schematic birds-eye-view (BEV) of radar returns collected from a moving sensor system from static and moving objects.
FIG. 3B shows the radar returns of FIG. 3B having been ego motion-compensated by accumulating them in a common static frame of reference.

FIG. 3A shows a BEV of an ego vehicle 300 equipped with a radar system of the kind described above. The ego vehicle 300 is moving in the world. The ego vehicle 300 is depicted at two time steps $T_{-1}$, $T_0$. A moving object 302 and a stationary object 304 are also depicted, i.e., objects that are, respectively, moving and stationary in the world.

At time step $T_{-1}$, two radar returns are depicted, from point 1 on the moving object 302 and point 2 on the static object 304, resulting in radar points ($\alpha_1$, $d_1$, $v'_1$, $t_1$) and ($\alpha_2$, $d_2$, $v'_2$, $t_2$) where $t_1=t_2=T_{-1}$. Note, both $v'_1$ and $v'_2$ are the measured radial velocity of Points 1 and 2 in the moving frame of reference of the ego vehicle 300 at $T_{-1}$. The azimuths $\alpha_1$, $\alpha_2$ and ranges $d_1$, $d_2$ are measured relative to the orientation and location $r_{sensor,-1}$ of the radar system at time $T_{-1}$. The moving object 302 is shown ahead of and moving slightly faster than the ego vehicle 300, resulting in a small positive $v'_1$; from the ego vehicle's perspective, the static object is moving towards it resulting in a negative $v'_2$. At subsequent time step $T_0$, radar points radar points ($\alpha_3$, $d_3$, $v'_3$, $t_3$) and ($\alpha_4$, $d_4$, $v'_4$, $t_4$) are obtained from Points 3 and 4 on the moving and static object 302, 304 respectively, with $t_3=t_4=T_0$. Both the ego vehicle 300 and the moving object 302 have moved since time $T_{-1}$, and the azimuths $\alpha_3$, $\alpha_4$ and ranges $d_3$, $d_4$ are measured relative to the new orientation and location of the sensor system $r_{sensor,0}$ at time $T_0$.

FIG. 3B shows the radar points of FIG. 3A accumulated in a common static frame of reference. In the depicted example, this is a stationary frame of reference that substantially coincides with the location of the ego vehicle 300 at time $T_0$. For each radar point, the azimuth and range measurements ($\alpha_k$, $d_k$) are converted to cartesian xy-coordinates $r_k=(x_k, y_k)$ in this common frame of reference. Odometry is used to measure the change in the pose of the ego vehicle 300 between time $T_{-1}$ and time $T_0$. This, in turn, allows the cartesian coordinates $r_1$ and $r_2$ of Points 1 and 2 to be computed in the common frame of reference (note, in this example, $r_1$ is the position of Point 1 on the moving object at time $T_{-1}$ but relative to the location of the ego vehicle 300 at time $T_0$; in general, $r_k$ is the vector displacement of the point k as sensed at time $t_k$ from the origin of the common static frame of reference). The cartesian coordinates $r_k$ as computed in the common static frame of reference are examples of ego motion-compensated coordinates.

The Doppler measurements are also ego-motion compensated. Given a Doppler velocity $v'_k$ measured in the moving ego frame of reference at time $t_k$, the corresponding Doppler velocity $v_k$ in the static reference frame is determined from the velocity of the ego vehicle 300 at time $t_k$ (known from odometry). Hence, in the static frame of reference, the ego motion-compensated Doppler velocities of Points 2 and 3 on the static object 304, $v_2$ and $v_3$, are approximately zero and the ego motion-compensated Doppler velocities of Points 1 and 4 on the moving object 302, $v_1$ and $v_4$, reflect their absolute velocities in the world because the effects of the ego motion have been removed.

In an online context, it is useful to adopt the above definition of the common reference frame, as it means objects are localized relative to the current position of the ego vehicle 300 at time $T_0$. However, any static reference frame can be chosen.

It is possible to perform ego motion-compensation highly accurately using state of the art odometry methods to measure and track ego motion (e.g., changes in ego velocity, acceleration, jerk etc.) over the accumulation window. Odometry is known per se in the field of fully and semi-autonomous vehicles, and further details of specific odometry methods are not described herein.

The subsequent steps described below all use these ego motion-compensated values. In the remainder of the description, references to radar positions/coordinates and Doppler velocities/dimensions refer to the ego motion-compensated values unless otherwise indicated.

A set of ego motion-compensated radar points {($r_k$, $v_k$, $t_k$)} accumulated over some window is one an example of an accumulated a radar point cloud. More generally, a radar point cloud refers to any set of radar returns embodying one or more measured radar characteristics, encoded in any suitable manner. The set of radar points is typically unordered and typically non-discretised (in contrast to discretized pixel or voxel representations). The techniques described below do not require the point cloud to be ordered or discretised but can nevertheless be applied with discretized and/or ordered points. Although the following examples focus on the Doppler dimension, the techniques can be alternative or additionally be applied to an RCS dimension.

Figure 4:
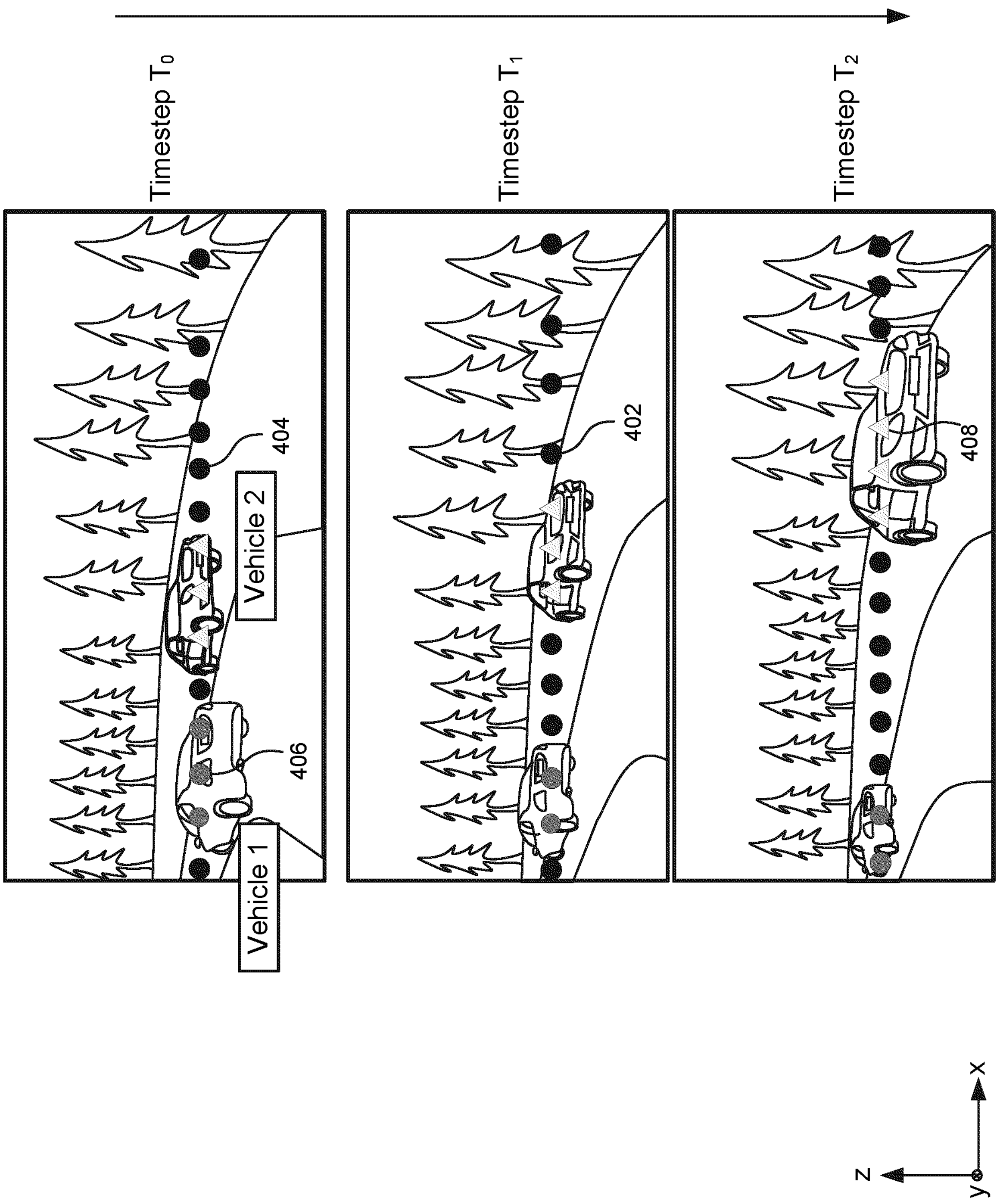
FIG. 4 shows a schematic illustration of radar returns collected over time from a radar-equipped vehicle.

FIG. 4 schematically illustrates how 2D radar returns might be generated over the course of multiple time steps $T_1$, $T_2$, $T_3$, . . . for a typical complex driving scene with a combination of static and dynamic objects. The radar returns labelled 402 and 404 are examples of radar returns from a static object, i.e., static in the world (but, in this case, moving towards the ego vehicle in the ego frame of reference because the ego vehicle is moving). The radar returns labelled 406 and 408 are examples of returns from dynamic objects (moving in the world), Vehicle 1 and Vehicle 2, moving away from and towards the ego vehicle respectively.

A typical radar system might operate at a frequency of the order of 10 Hz, i.e., around 10 timesteps per second. It can be seen in FIG. 4 that the returns labelled 404 and 408 have been captured in the same timestep $T_2$, and those returns will therefore have matching timestamps.

As indicated, radar returns captured in this way are accumulated over multiple time steps (spanning an accumulation window), and clustering is applied to the accumulated returns in order to resolve individual objects in the accumulated returns. Odometry is used to estimate and track the ego motion in the world frame of reference, over the duration of the accumulation window, which in turn is used to compensate for the effects of the ego motion in the Doppler returns to more readily distinguish dynamic object returns from static object returns in the clustering step. For each identified cluster, a motion model is fitted to the returns of that cluster, to then allow those returns to be unsmeared (rolled backwards or forwards) to a single timestep.

As noted, the system also compensates for position change of all the returns (moving and non-moving) due to ego motion. This compensation for ego position changes is sufficient to unsmear static returns (because the smearing was caused exclusively by ego motion). However, further processing is needed to unsmear the dynamic returns (because the smearing was caused by both ego motion and the object's own motion). The two effects are completely separable, hence the ego motion smearing can be removed independently of dynamic object spearing.

Principles of Motion Modelling

Figure 5:
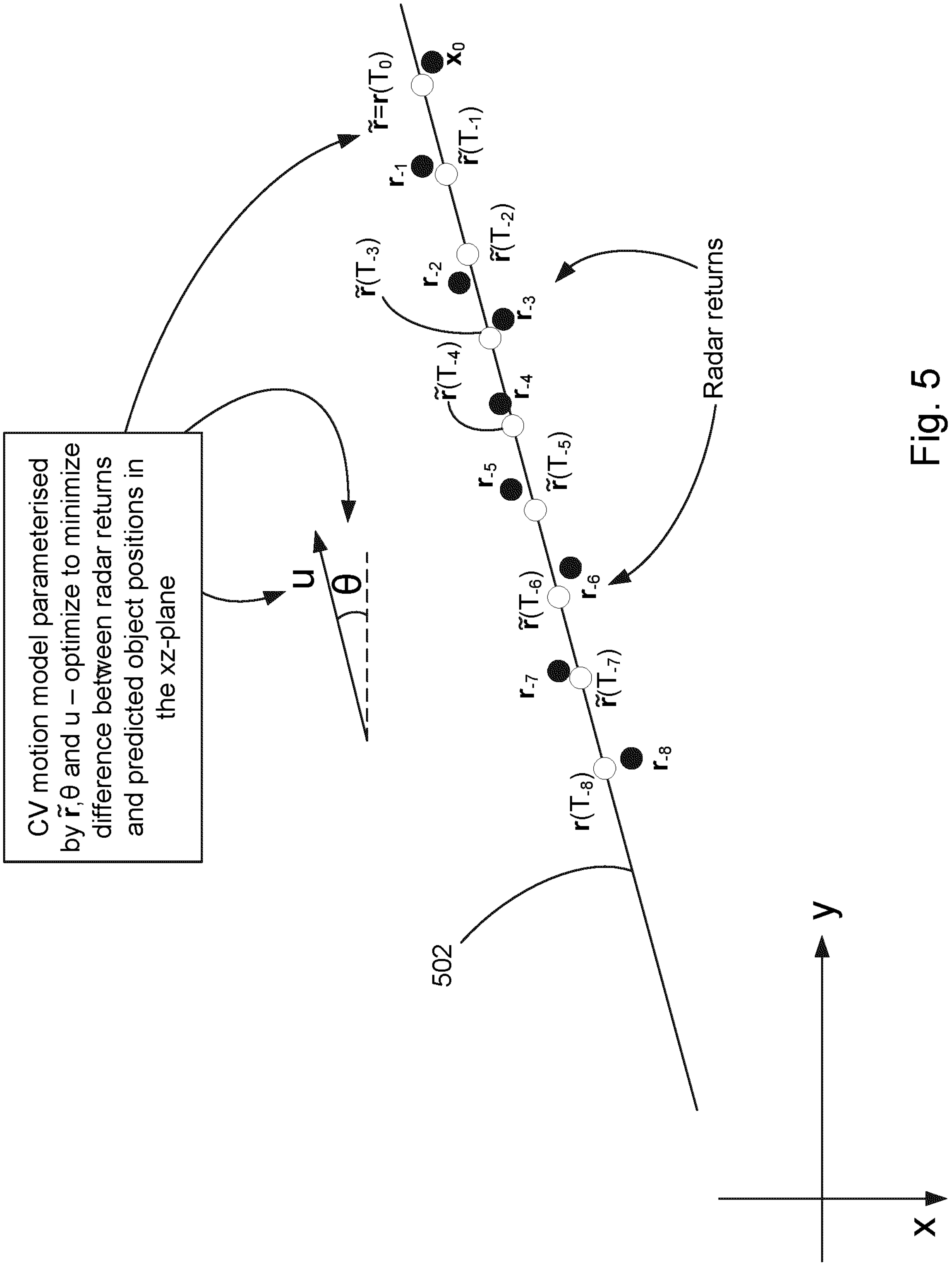
FIG. 5 depicts an example of a motion model fitted to radar points.

FIG. 5 is a schematic figure that illustrates certain principles of motion modelling. FIG. 5 depicts xy-radar locations $r_{-8}$, . . . , $r_0$ corresponding to radar returns at uniformly incrementing timesteps $T_{-8}$, . . . , $T_0$, from a point travelling at some approximately constant velocity and with some approximately constant heading in the xy-plane.

A simple constant velocity (CV) model assumes constant velocity μ and constant heading θ in the xy-plane. This model has relatively few degrees of freedom, namely θ, μ and $\tilde{r}$.

A "transition function" for this model described the change in object state between time steps, where a predicted object state at time $T_{n+1}$ relates to a predicted object state at time $T_n$ as:

$$\begin{pmatrix} \theta \\ u \\ x(T_{n+1}) \\ y(T_{n+1}) \end{pmatrix} = \begin{pmatrix} \theta \\ u \\ x(T_n) \\ y(T_n) \end{pmatrix} + \begin{pmatrix} 0 \\ 0 \\ u\Delta T\cos\theta \\ u\Delta T\sin\theta \end{pmatrix},$$

with $(x(T_0), y(T_0))=\tilde{r}$. Choosing $T_0=0$ for convenience, this defines an object trajectory in the xy-plane as:

$$\tilde{r}(t) = \tilde{r} + \begin{pmatrix} ut\cos\theta \\ ut\sin\theta \end{pmatrix},$$

where $\tilde{r}(t)$ is a predicted (modelled) position of the object at time t ($\tilde{r}(T_0)=\tilde{r}$ being the predicted position at time $T_0$).

It is possible to fit the parameters θ, μ, $\tilde{r}$ to the radar positions by choosing values of those parameters that minimize the distance between the detected point $r_n$ at each time step $T_n$ and the predicted object position $(x(T_n), y(T_n))^T$ in the xy-plane at $T_n$.

In the example of FIG. 5, the CV model is a good fit, and it is there to achieve values of θ, μ, $\tilde{r}$ that result in a small distance between the radar coordinates $r_n$ and the predicted obstacle position $(x(T_n), z(T_n))^T$ at each timestep $T_n$.

According to the CV motion model, the object trajectory is described a straight-line path in the xy-plane and a constant velocity u at every point along that path.

As will be appreciated, the same principles can be extended to more complex motion models, including other physics-based models such as constant turn rate and velocity (CTRV), constant turn rate and acceleration (CTRA) etc. For further examples of motion models that can be applied in the present context, see "Comparison and Evaluation of Advanced Motion Models for Vehicle Tracking", Schubert et. al (2008, available at http://fusion.isif.org/proceedings/fusion08CD/papers/1569107835.pdf, which is incorporated herein by reference in its entirety. With more complex motion models, the same principles apply; the object trajectory is modelled as a spline together with motion states along the spline described by a relatively small number of model parameters (small in relation to the number of accumulated returns to ensure reasonable convergence).

FIG. 5 is provided to illustrate certain concepts of motion modelling and is an oversimplification of the problem in two important respects. Firstly, it only considers a single object and, secondly, it treats that object as a single point (i.e., it assumes that all radar returns are generated from the same object point). The techniques described below address both issues.

Note that the motion modelling of FIG. 5 uses only position and time. The radial velocities measured via Doppler shift are not used to fit the motion model in this example. This is a viable approach, and in that case the Doppler dimension is used in the clustering step (as described below) but not motion model fitting. In an extension described below, the Doppler dimension is used for model fitting, in a process that simultaneously fits a motion model and estimates a bounding box for the object in the xy-plane.

The two-stage approach outlined above will now be described in more detail.

First Stage—Clustering

Figure 6A:
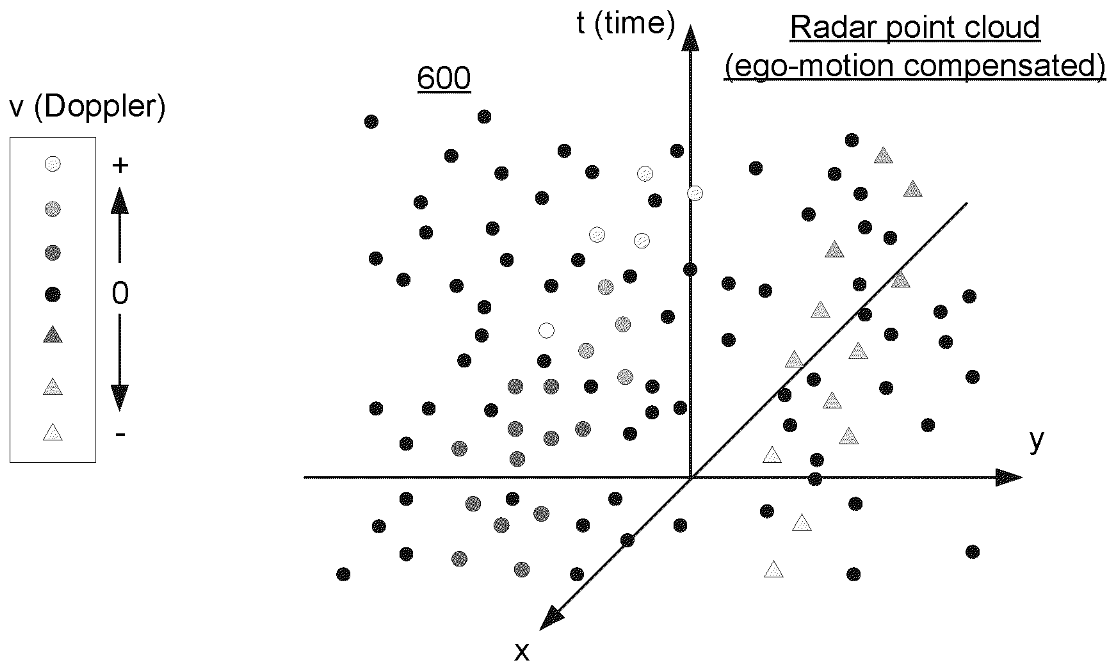
FIG. 6A shows an example of an accumulated radar point cloud with 2D spatial, time and Doppler dimensions.

FIG. 6A shows a schematic perspective view of an accumulated radar point cloud 600 in xyt-space, with the magnitude of the doppler dimension v denoted using shading; points with zero or positive radial velocity (away from the ego vehicle) are represented as circles, whereas points with negative radial velocity are represented as triangles.

The radar point cloud has been accumulated over multiple timesteps, e.g. of the order of ten timesteps.

In many practical scenarios, and driving scenarios in particular, the accumulated radar return will capture complex scenes containing multiple objects, at least some of which may be dynamic. Clustering is used to resolve individual objects in the accumulated radar point cloud. Clustering is performed to assign radar points to clusters (object clusters), and all radar points assigned to the same cluster are assumed to belong to the same single object.

The radar point cloud 600 is ego motion-compensated in the above sense. Points from objects that are static in the world frame of reference therefore all have substantially zero radial velocity measurements once the ego motion has been compensated for (static object points are shown as black circles).

Figure 6B:
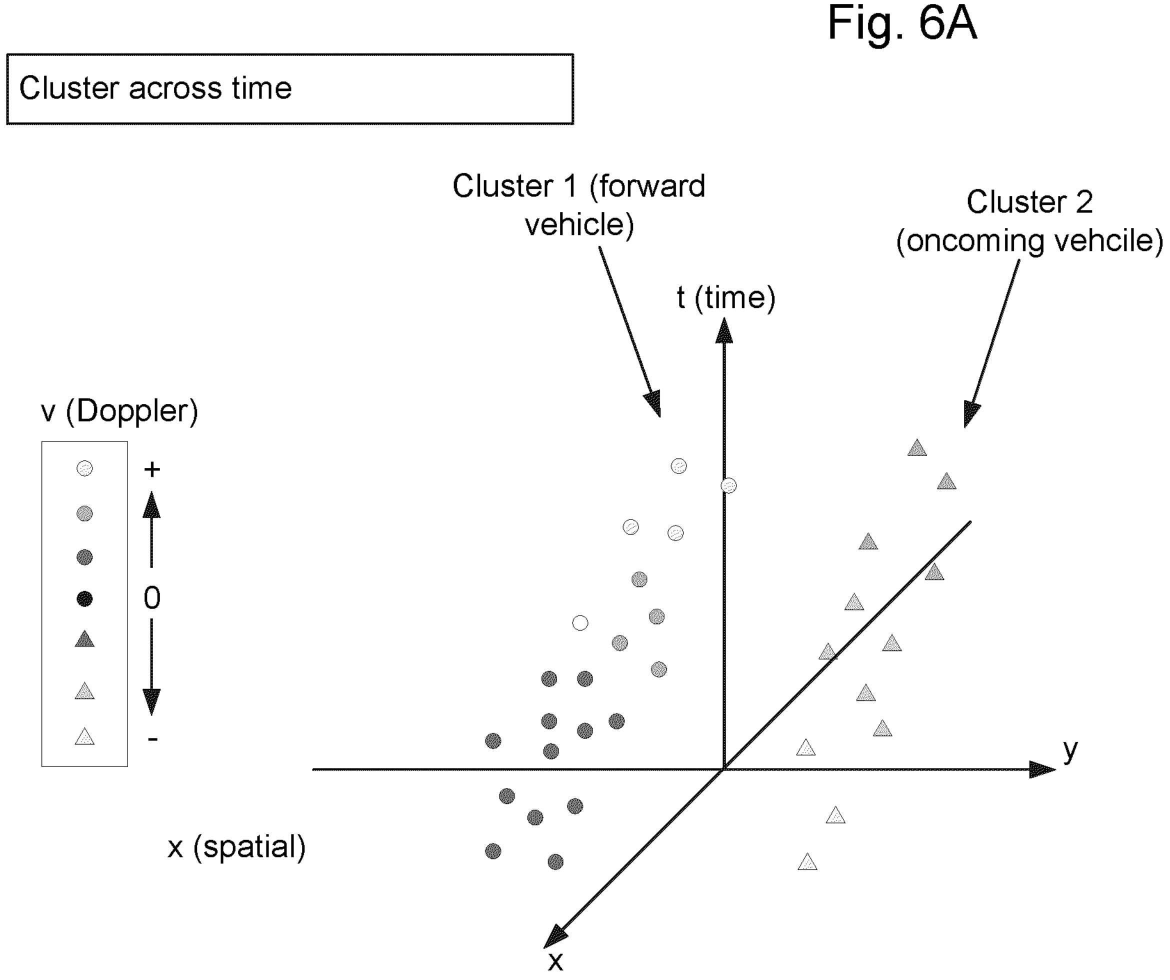
FIG. 6B shows example clusters identified in the radar point cloud of FIG. 6A by clustering over the spatial, time and Doppler dimensions.

FIG. 6B shows the results of clustering applied to the radar point cloud 600. The clustering has resulted in the identification of two clusters, Cluster 1 and Cluster 2, broadly corresponding to Vehicle 1 and Vehicle 2 as depicted in FIG. 4, moving away from and towards the ego vehicle respectively.

For clarity, FIG. 6B omits static object points, i.e., whose ego motion-compensated motion is substantially zero.

Clustering is performed across the time and velocity dimensions, t and v, as well as the spatial coordinate dimensions, x and y. Clustering across time t prevents radar points that overlap in space (i.e., in their x and y dimensions) but not in time from being assigned to the same cluster. Such points could arise from two different objects occupying the same space but at different times. Clustering across the velocity dimension v helps to distinguish radar points from static and dynamic objects, and from different dynamic objects travelling at different speeds—points with similar xyt-components but very different velocity components v will generally not be assigned to the same object cluster, and will therefore be treated in the subsequent steps as belonging to different objects.

Density-based clustering can be used, for example DBSCAN (Density-based spatial clustering of applications with noise). In density-based clustering, clusters are defined as areas of relatively higher density radar points compared with the point cloud as a whole.

DBSCAN is based on neighbourhood thresholds. Two points are considered "neighbours" if a distance between them is less than some defined threshold $\epsilon$. In the present context, the concept of a neighbourhood function is generalized—two radar points j, k are identified as neighbours if they satisfy a set of threshold conditions:

1. The Euclidian distance between them, $\sqrt{(x_j-x_k)^2+(y_j-y_k)^2}$ is less than some threshold $\epsilon_r$;
2. A difference in their respective Doppler components $v_j$, $v_k$ is less than some threshold $\epsilon_v$; and
3. A difference in their respective timestamps $t_j$, $t_k$ is less than some threshold $\epsilon_t$.

DBSCAN or some other suitable clustering technique is applied with this definition of neighbouring points. The "difference" between two values $d_j$, $d_k$ can be defined in any suitable way, e.g., as $|d_j-d_k|$, $(d_j-d_k)^2$ etc.

Clustering methods such as DBSCAN are known and the process is therefore only briefly summarised. A starting point in the point cloud is chosen. Assuming the starting point has at least one neighbour, i.e., point(s) that satisfy all of the above threshold conditions with respect to the starting point, the starting point and its neighbour(s) are assigned to an initial cluster. That process repeats for the neighbour(s)—adding any of their neighbour(s) to the cluster. This process continues iteratively until there are no new neighbours to be added to that cluster. The process then repeats for a new starting point outside of any existing cluster, and this continues until all points have been considered, in order to identify any further cluster(s). If a starting point is chosen that has no neighbours, that point is not assigned to any cluster, and the process repeats for a new starting point. Points which do not satisfy all of the threshold conditions with respect to at least one point in the cluster will not be assigned to that cluster. Hence, points are assigned to the same cluster based on similarity not only of their spatial components but also their time and velocity components. Every starting point is some point that has not already been assigned to any cluster—points that have already been assigned to a cluster do not need to be considered again.

A benefit of DBSCAN and similar clustering methods is that they are unsupervised. Unsupervised clustering does not require prior knowledge of their objects or features.

Rather, object clusters are identified based on straightforward heuristics—the thresholds $\epsilon_r$, $\epsilon_v$ and $\epsilon_t$ in this case.

The clustering of the first stage is a form of object detection as that term is used herein; in this example, object clusters are detected based on simple heuristics (the threshold) rather than recognizing learned patterns in the data.

Alternatively, a supervised point cloud segmentation technique, such as PointNet, could be used to identify clusters. That would generally require a segmentation network to be trained on a sufficient amount of suitable training data, to implement the clustering based on semantic segmentation techniques. Such techniques can be similarly applied to the velocity and time dimensions as well as the spatial dimensions of the radar points. The aim remains the same, i.e., to try to assign, to the same cluster, points that are likely to belong to the same moving object. In this case, clusters are identified via learned pattern recognition.

First Stage—Motion Modelling

Once a moving object cluster is identified, the position of the points in space and time are used to fit parameters of a motion model to the cluster. Considering points on a spline, with the knowledge that the points detections of a vehicle, it is possible to fit a model of the vehicle's velocity, acceleration, turn rate etc.

Once a motion model has been fitted, the motion profile of the vehicle is known—that, in itself, is a useful detection result that can feed-directly into higher-level processing (such as prediction and/or planning in an autonomous vehicle stack).

A separate motion model is fitted to each cluster of interest, and the motion model is therefore specific to a single object. The principles are similar to those described above with reference to FIG. 5, extended to accommodate the non-zero extent of the object, i.e., the fact that, in general, different radar points are detected from different points on the object.

Figure 7A:
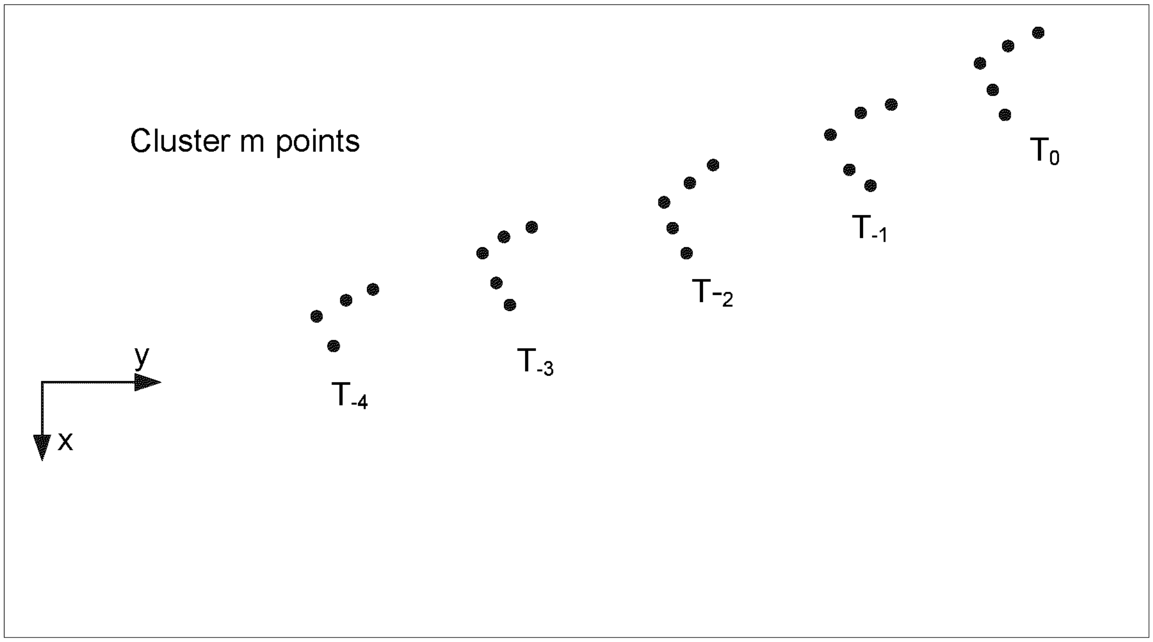
FIG. 7A shows a BEV of radar point of a moving object cluster, accumulated over multiple time steps, that exhibit smearing effects as a consequence of object motion.

FIG. 7A shows radar points of some cluster m viewed in the xy-plane. Purely for the sake of illustration, the cluster is shown to include points accumulated across five-time steps $T_{-4}, \ldots T_0$.

Similar to FIG. 5, the points of cluster m are "smeared" across the xy-plane because the object from which they have been captured was moving over the duration of the accumulation window. Applying the motion modelling principles above, this effect can be used to fit a motion model to the cluster.

Figure 7B:
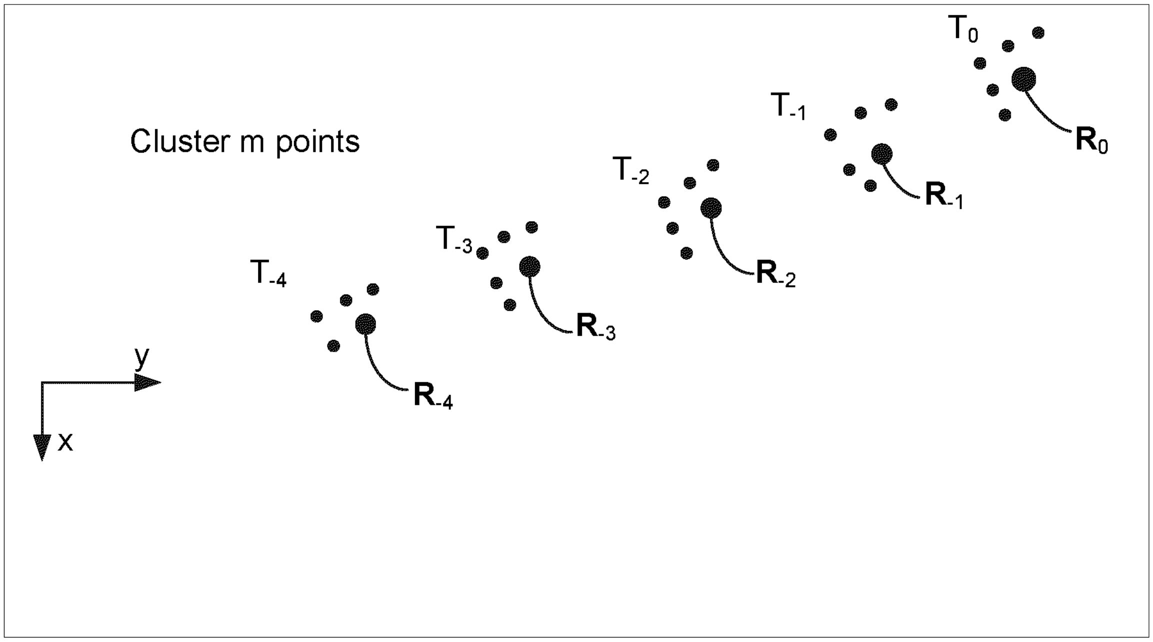
FIG. 7B shows centroids determined for the cluster at each time step.

As shown in FIG. 7B, to simplify the fitting, for each cluster m, a centroid $R_n$ is computed for each timestep $T_n$, which is the centroid of the radar points belonging to cluster m and having timestamp $t_k=T_n$. There will typically be multiple radar points in a cluster having matching time stamps.

Figure 8:
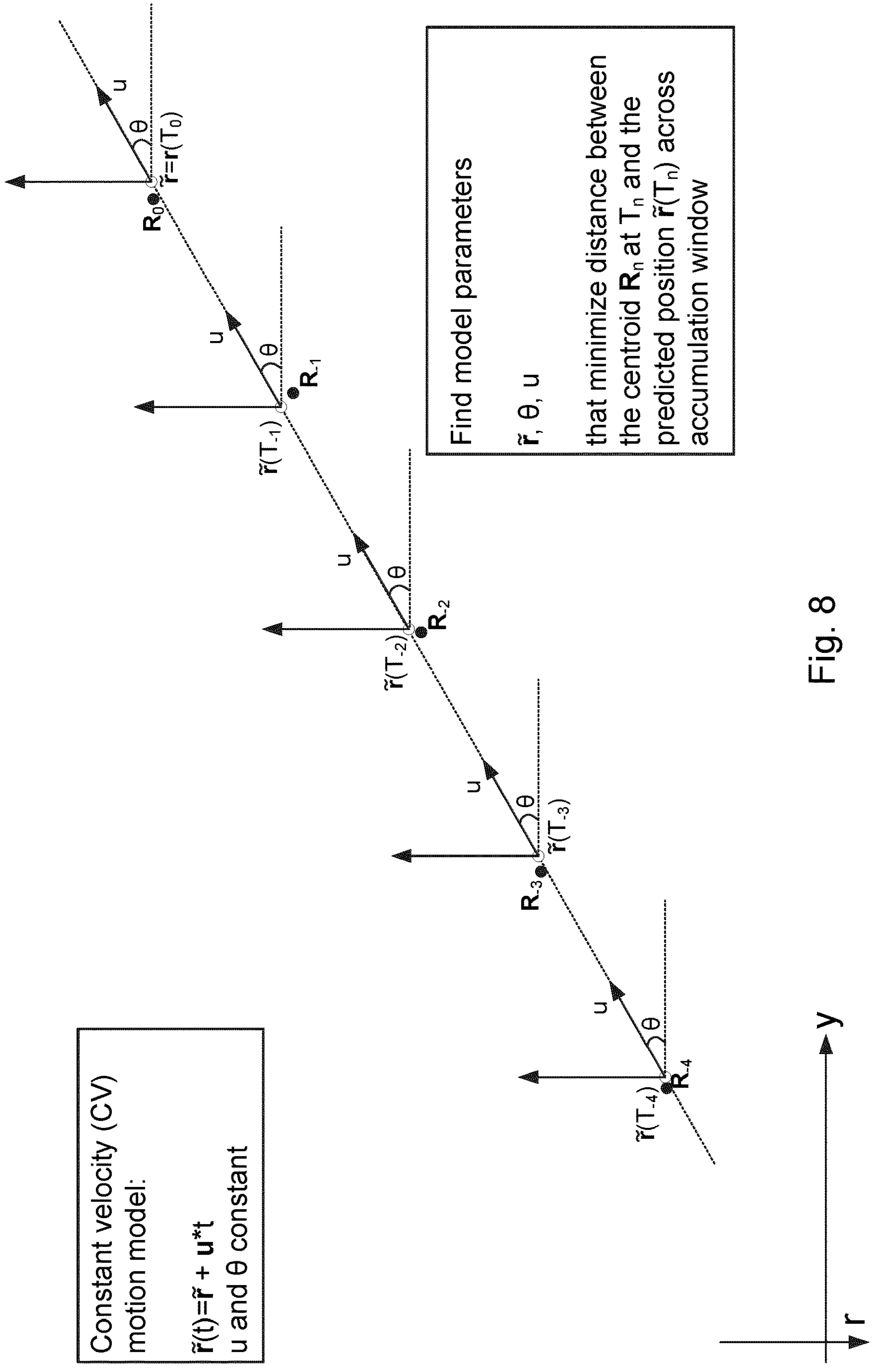
FIG. 8 shows an example motion model fitted to cluster centroids.

As depicted in FIG. 8, the motion modelling principles described above with reference to FIG. 5 can now be applied to cluster m, exactly as described, on the centroids $R_{-4}, \ldots, R_0$ of cluster m. This example adopts a simple CV model, where the aim is to find model parameters $\tilde{r}$, θ, μ that minimize angular separation between the centroid $R_n$ at $T_n$ and the predicted position $\tilde{r}(T_n)$ across the accumulation window.

Once the model has been fitted, the estimated trajectory of the object—that is, its path in 2D space and its motion profile along that path—is known across the accumulation time window. This, in and of itself, may be sufficient information that can be passed to higher-level processing, and further processing of the cluster points may not be required in that event.

Alternatively, rather than computing centroids and then fitting, the motion model can be fitted to the radar points of a cluster directly. The principle is the same—the aim is to find model parameters that overall minimize the angular deviation between the predicted object position $\tilde{r}(T_n)$ at each time step and the radar returns at $T_n$.

Second Stage—Unsmearing

Figure 9A:
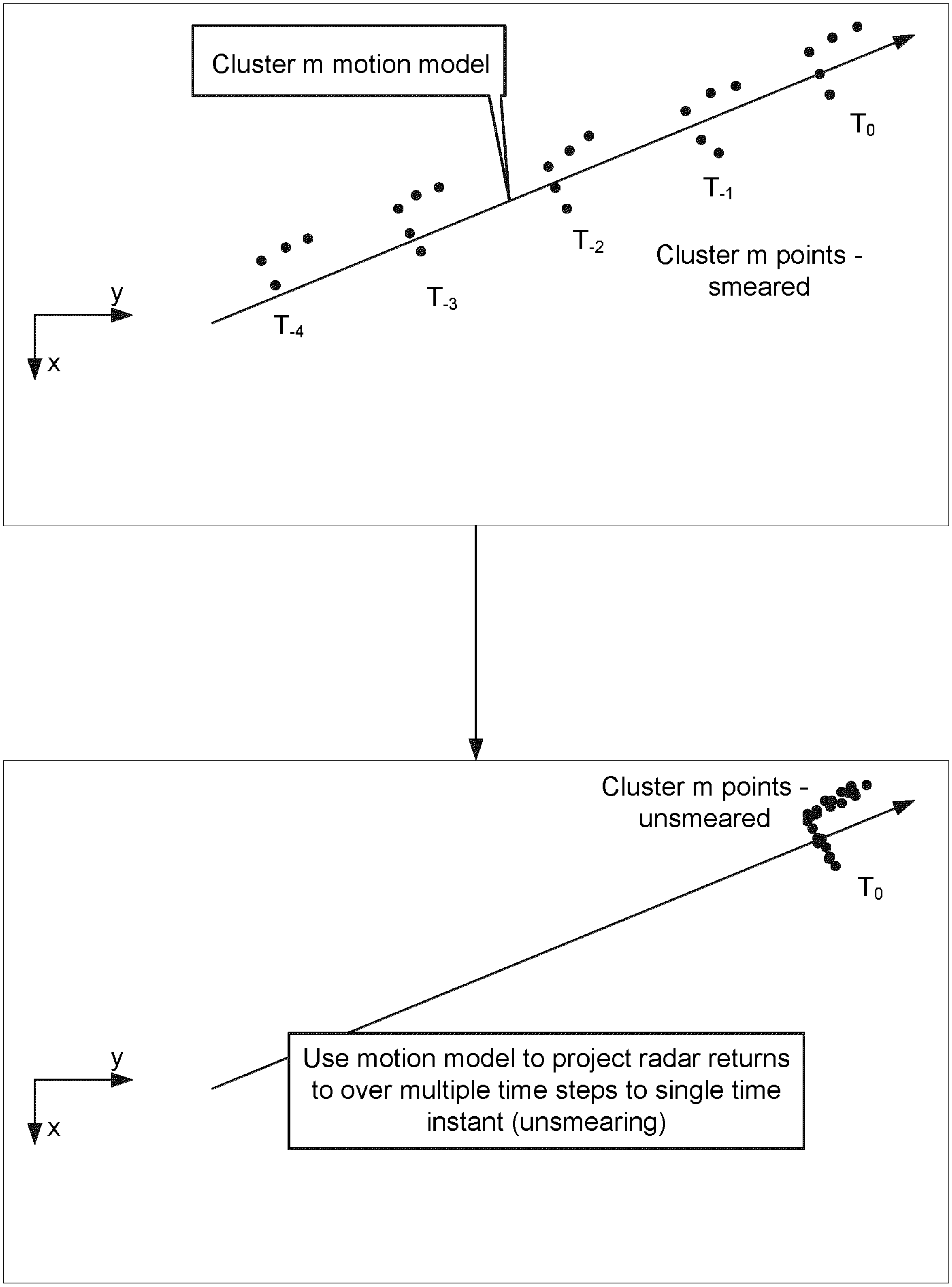
FIG. 9A shows how the cluster points of FIG. 7A may be "unsmeared" by using a motion model transforming those points to a common reference time.

With reference to FIG. 9A, the aim of unsmearing is to roll all of the cluster points backwards or forwards to a single time instant using the motion model. The purpose of this step is to obtain a relatively dense set of object points that can then be interpreted using one or more perception components. Once the motion model has been computed for a cluster, it is straightforward to project all points of the cluster to a single time instant: for a point k with spatial coordinates $r_k$ measured at time $t_k$, any change in the object position between $t_k$ and $T_0$ is given by the motion model for the cluster to which $r_k$ belongs. It is straightforward to determine the corresponding inverse geometric transformation, which is applied to $r_k$ to compute $s_k$—the inferred position of the point k at time $T_0$ according to the motion model. In some implementations, the unsmearing can also account for changes in object orientation.

In the example of FIG. 9A, the transformation is a simple translation to account for the change in object position. Depending on the motion model, the transformation could involve rotation, to account for any change in the orientation of the object that is predicted by the model (as in the extension described below).

The bottom part of FIG. 9A shows the unsmeared points of cluster m in the xy-plane. As can be seen, by projecting the cluster points to a common time instant, $T_0$, a dense set of points describing the object is obtained.

Figure 9B:
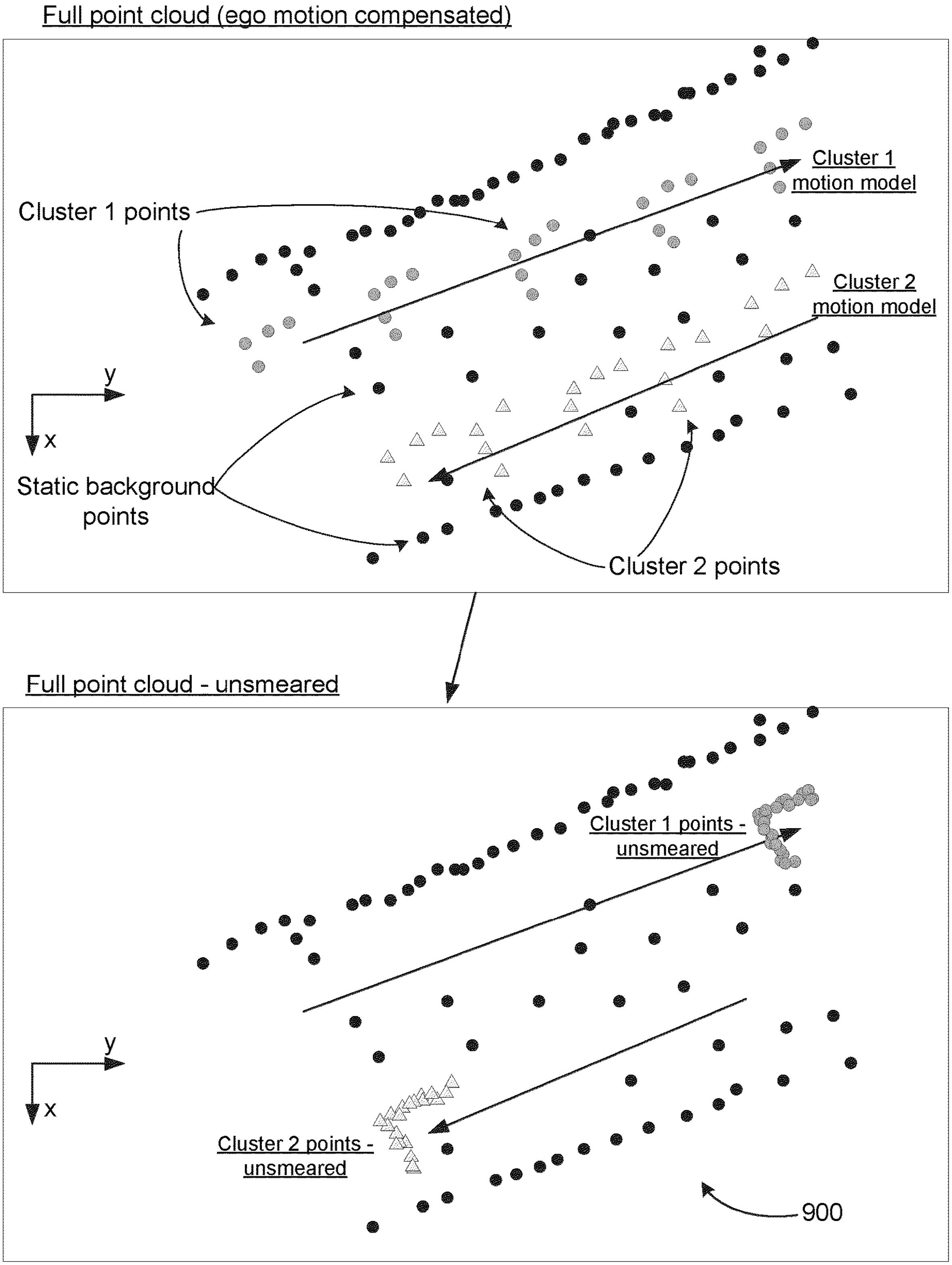
FIG. 9B shows a transformed point cloud made up of untransformed static object points and moving object points from multiple object clusters, which have been unsmeared using respective motion models.

FIG. 9B shows how a full, unsmeared point cloud is obtained by applying the above steps to each moving object cluster. The top part of FIG. 9A shows an accumulated, ego motion-compensated point cloud prior to unsmearing—this corresponds to a bird's-eye-view of the FIG. 6A. The two clusters of FIG. 6B have been identified and separate motion models fitted to them as above.

The bottom part of FIG. 9B shows a full unsmeared point cloud 902 obtained by unsmearing the moving object points of Cluster 1 and Cluster using their respective motion models, and leaving the static object points unchanged. The full unsmeared point cloud comprises the original ego motion-compensated background points and the unsmeared points of Cluster 1 and Cluster 2.

The time and velocity components $t_k$, $v_k$ may or may not be retained in the unsmeared point cloud for the purpose of the second stage processing. In the examples below, the Doppler components $v_k$ are retained, because they can provide useful information for object recognition in the second stage, but the timestamps $t_k$ are not retained for the purpose of the second stage (in which case, strictly speaking, each point of the transformed point cloud is a tuple ($s_k$, $v_k$), although $s_k$ may still be referred to as a point of the transformed point cloud for conciseness; as discussed below, the Doppler values $v_k$ may or may not be similarly transformed to account for object motion between $t_k$ and $T_0$).

Unsmearing does not need to be performed for static object points because they do not exhibit the same smearing effects as moving object points. For static object points, compensating for ego motion via odometry is sufficient.

Second Stage—Object Detection

The processing summarized with respect to FIG. 9B overcomes the problem of radar sparsity—once the moving object points have been unsmeared in this way, perception components of the kind used in computer vision or lidar recognition (such as deep CNNs) can be applied. Such components would generally not perform well on cluster points from a single time step, because those radar points are generally too sparse. Accumulating and unsmearing the cluster points transforms them into something more closely resembling an image or dense lidar point cloud, opening up the possibility of applying state-of-the-art computer vision and lidar recognition machine learning (ML) architectures to radar.

Figure 9C:
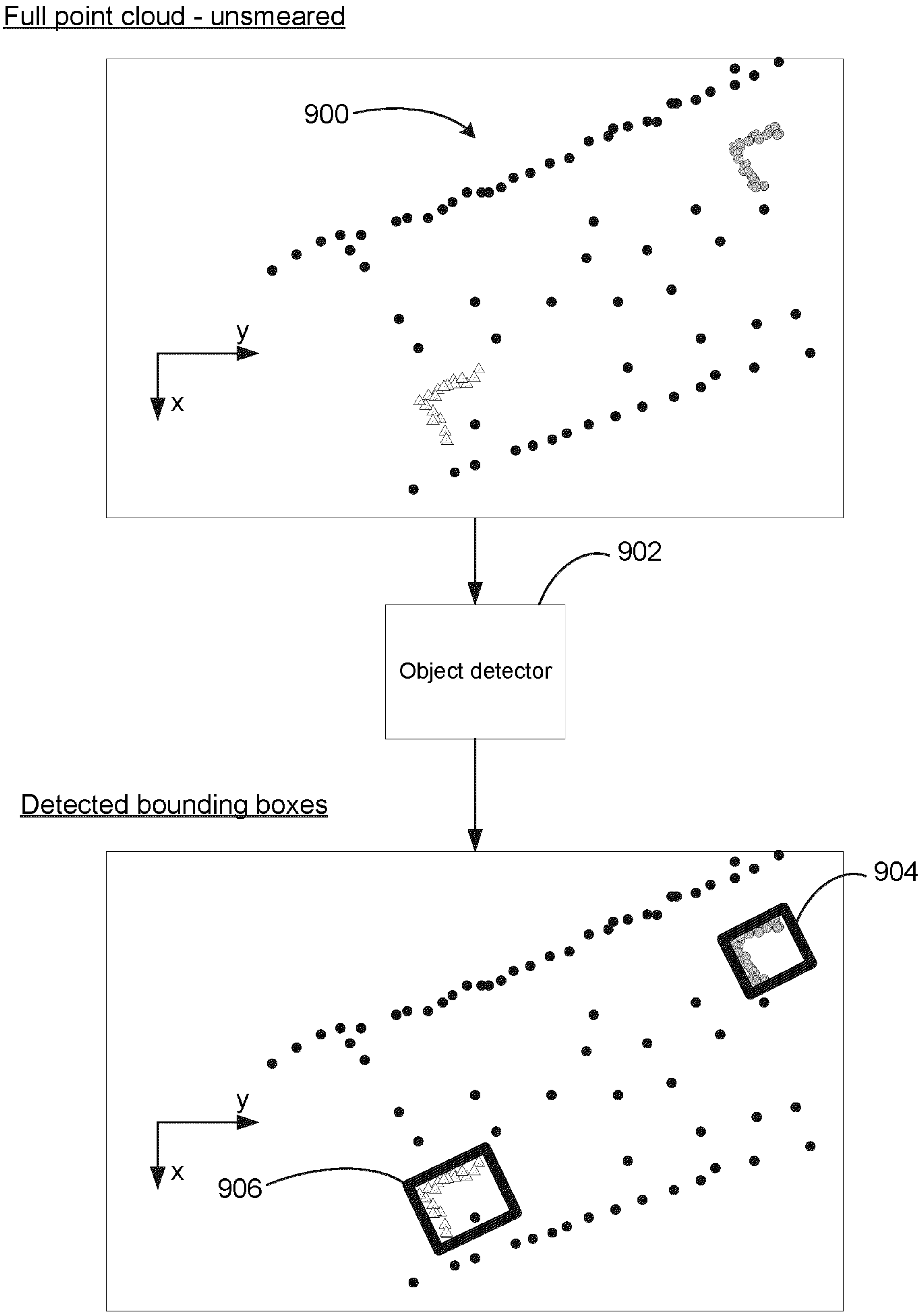
FIG. 9C depicts an output of an example object detector applied to a transformed point cloud.

FIG. 9C shows the full unsmeared point cloud 900 inputted to a perception component 902, which is an object detector in this example. The object detector 902 is implemented as a trained supervised ML model, such as a CNN trained on example inputs annotated with ground truth object detection outputs.

Depending on the architecture of the perception component 900, the unsmeared points 900 may or may not be transformed to provide a suitable input. Certain ML architectures, such as PointNet can operate directly on "raw" point cloud data (unordered and non-discretised) in 2D or 3D. Other architectures require discretisation of the input, in 2D (pixels) or 3D (voxels), in which case the unsmeared points 902 may be suitably discretized before they are inputted to the perception component 900.

In this example, the object detector 902 provides a perception output in the form of a set of detected bounding boxes 904, 906. Note, the operation of the object detector 902 is only dependent on the clustering and motion modelling of the first stage in so far as the clustering and motion modelling affect the structure of the full unsmeared point could 900. The object detector 902 is performing a separate object detection method based on learned pattern recognition that is otherwise independent of the clustering of the first stage. Whilst the clustering of the first stage is (in some embodiments) based on simple heuristic thresholds, the second stage detects objects by recognizing patterns it has learned in training.

In the example of FIG. 9B, the point cloud 900 has been derived from 2D radar measurements. There is no height (z) dimension. However, as in the clustering, the Doppler measurements can provide an additional dimension in place of height.

For example, a PIXOR representation of a point cloud is a BEV image representation that uses occupancy values to indicate the presence or absence of a corresponding point in the point cloud and, for 3D point clouds, height values to fully represent the points of the point cloud (similar to the depth channel of an RGBD image). The BEV image is encoded as an input tensor, having an occupancy channel that encodes an occupancy map (typically binary) and, for a 3D point cloud, a height channel that encodes the height of each occupied pixel. For further details, see Yang et al, "PIXOR: Real-time 3D Object Detection from Point Clouds", arXiv:1902.06326, which is incorporated herein by reference in its entirety.

For 2D radar, there are no height values. However, the Doppler velocity can be encoded in the same way as height values would be for a 3D point cloud.

Figure 9D:
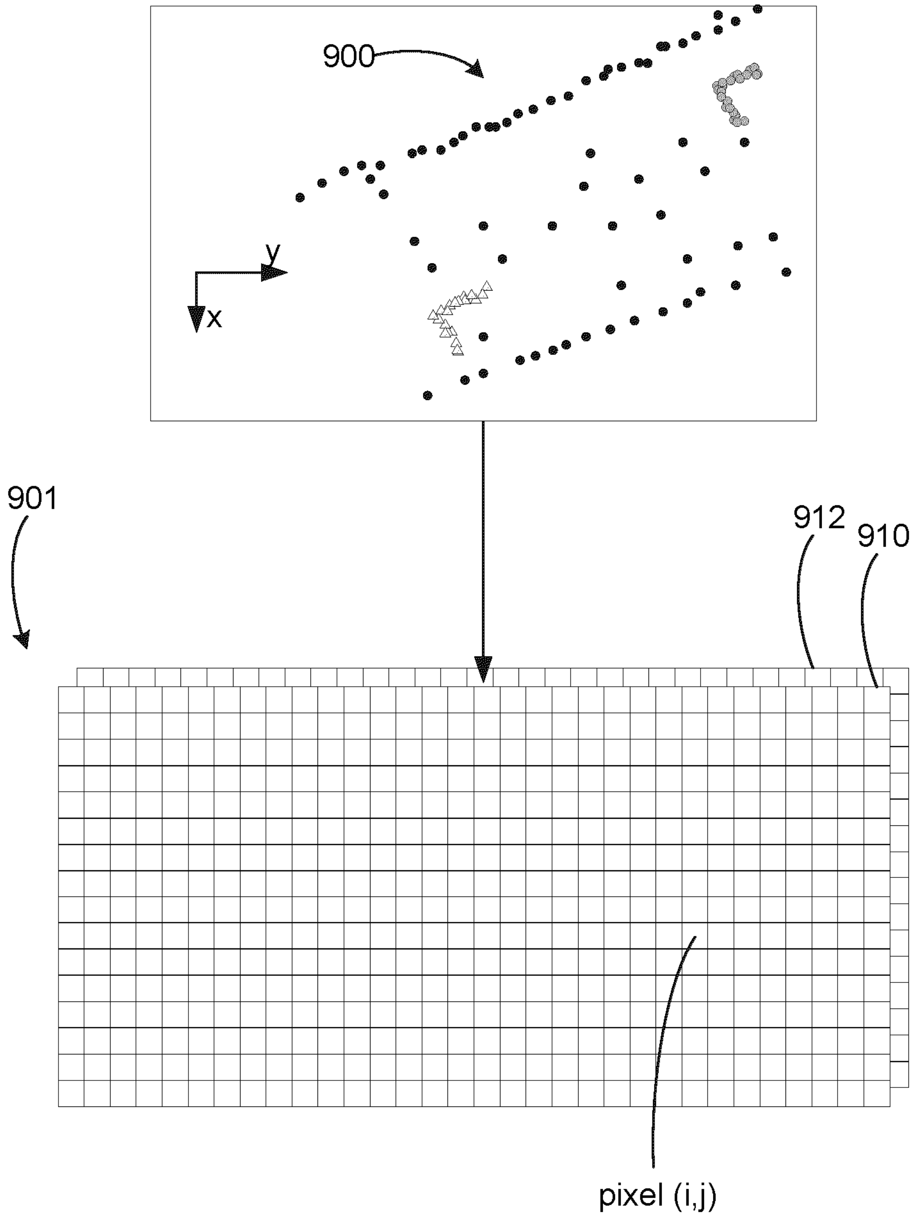
FIG. 9D schematically depicts a discretised image representation of a transformed point cloud, in the form of an input tensor.

FIG. 9D schematically depicts a PIXOR encoding of the full unsmeared point cloud 900. An input tensor 901 is shown having an occupancy channel 910, which encodes a discretised, binary image of the point cloud 900. For each pixel (i,j), the binary occupancy value of the occupancy channel 910 at that pixel indicates whether or not a point is present at a corresponding location in the point cloud 900. A velocity channel 912 of the input tensor 901 encodes the Doppler measurements—for each occupied pixel, the value of the Doppler channel at that pixel contains the Doppler velocity for the corresponding point in the point cloud 900.

The Doppler measurements provided to the object detector 902 in the input tensor 910 may or may not be "unsmeared" in the same way as the spatial coordinates. In principle, given a Doppler velocity $v_k$ at time $t_k$, the motion model could be used to account for the object motion between $t_k$ and $T_0$ in a similar way (at least to some extent). However, in practice, this may not be required as the original ego motion-compensated Doppler velocities $v_k$ remain useful without unsmearing, particularly for assisting the object detector 902 in distinguishing between static and moving objects.

As an alternative or in addition to retaining the Doppler measurements for the second stage, one or more velocity channels 912 of the input tensor 901 could be populated using the motion model(s). For example, given a pixel (i,k) corresponding to a moving object point, the velocity channel(s) could encode the velocity at time $T_0$ of the object to which that point belongs according to its cluster's motion model (which would lead to some redundant encoding of the object velocities). More generally, one or more object motion channels can encode various types of motion information from the object model(s) (e.g., one or more of linear velocity, angular velocity, acceleration, jerk etc.). This could be done for radar but also other modalities, such as lidar or RGBD where Doppler measurements are unavailable.

Alternatively or additionally, although not depicted in FIG. 9B, RCS values could be similarly encoded in a channel of the input tensor 901 for use by the perception component 900.

Once the point cloud has been unsmeared, the timestamps are generally no longer relevant and may be disregarded in the second stage.

Motion Modelling—Extension

As discussed, in an individual radar scan, it is generally difficult to discern the shape of an object. However, when scans are accumulated over time, for static objects it is apparent that vehicles show up as boxes (or rather, L shapes), in the radar data. For moving objects, however, when radar points are accumulated over time, the cluster of points belonging to the moving objects appears to be "smeared" out over time, so it is not possible to easily discern the shape of the object by eye, because it is so entangled with the object's motion. In the examples above, this is addressed by clustering the points and fitting a motion model to each cluster. The above motion models are based on time and position only—the Doppler measurements, whilst used for clustering, are not used in the fitting of the motion model.

The above motion models predict object location as a function of time, and a model is fitted to the radar points by selecting model parameters to match positions predicted by the motion model to the actual measured positions. The Doppler measurements can be incorporated in the model fitting process using similar principles, i.e., by constructing a motion model that provides Doppler predictions and turning the model parameter(s) in order to match those predictions to the actual Doppler measurements. A practical challenge is that a Doppler measurement from a moving object depends not only on its linear velocity but also its angular velocity. For a rotating object (such as a turning vehicle), the Doppler velocity measured from a particular point on the vehicle will depend on the radial component of the vehicle's linear velocity but also the vehicle's angular velocity and the distance between that point and the vehicle's center of rotation.

An extension of the motion modelling will now be described, in which a box is fitted to a moving vehicle (the target object) that has been identified in a time-accumulated radar point cloud. The box is fitted simultaneously with the object's motion.

In order to fit data to the point cloud, the following model-based assumptions are made:

- The target object has a substantially rectangular profile in the xy-plane;
- In the accumulated point cloud, at least two, and usually three corners of the target are visible (i.e. at least one complete side of the vehicle is visible, and usually two complete sides are visible);
- Each radar return in a given cluster is an observation of the edge of the L-shaped target;
- The target moves with a smooth trajectory centred at the centre of the target. This accommodates many possible motion models, e.g., CTRA, CTRV, CV etc.
- The output of DBSCAN gives a segmentation of only a single target, i.e., one object per cluster.

The parameters of the model (fit variables) are as follows:

- Length, width (i.e. box dimensions);
- Pose (of the centre of motion), i.e. position and orientation;
- Twist (of the centre of motion), i.e. linear and angular velocity;
- Optional: Acceleration (of the centre of motion).

The general principle of the fit is that a function is constructed that allows the fit variables to be mapped onto the radar data. As noted, the extent of the object makes presents a challenge if the fitting is to account for the fact that the cluster contains multiple observations of the target's position at different points of the vehicle.

Figure 10A:
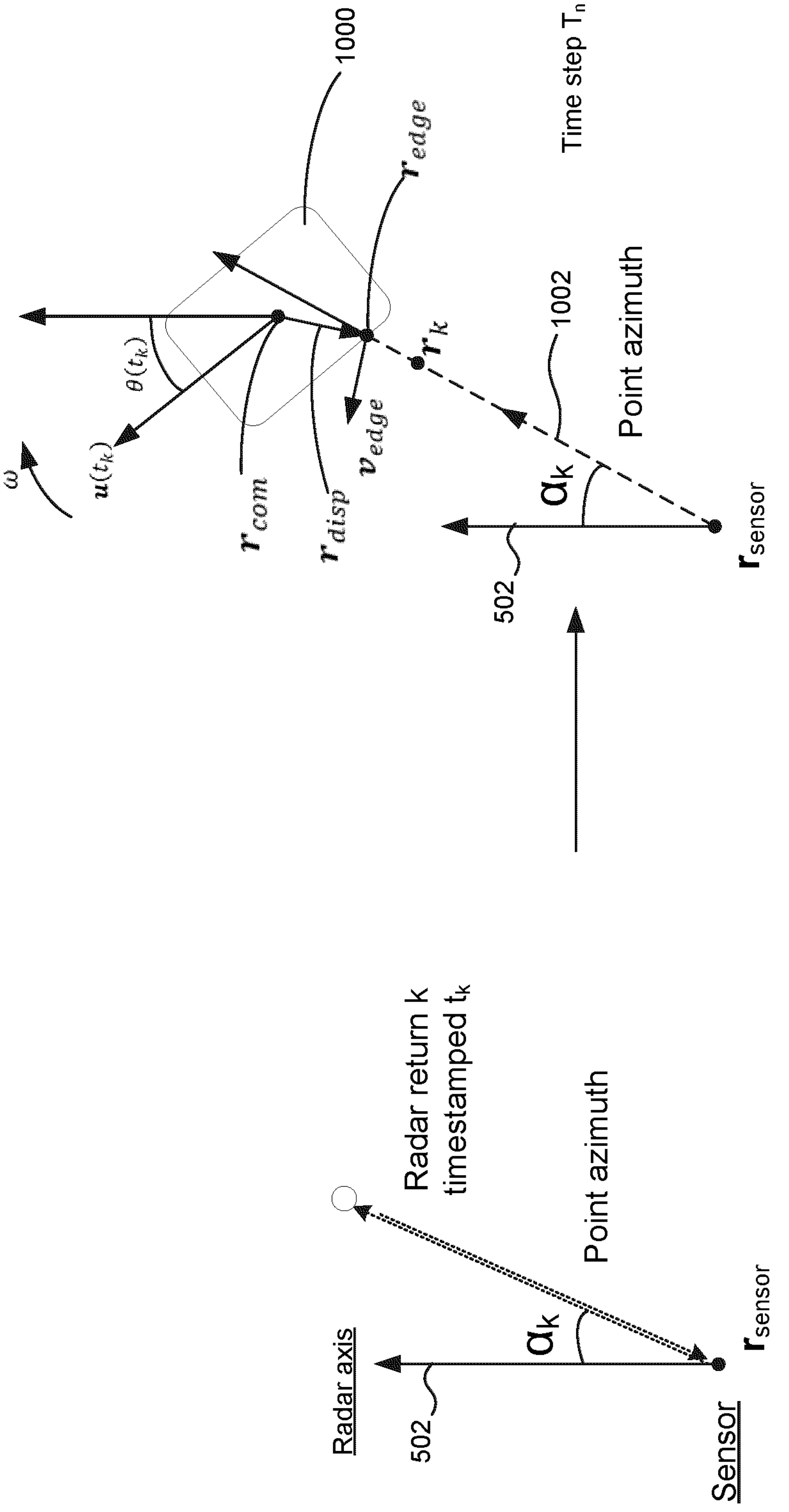
FIGS. 10A and 10B illustrate the application of an extended motion modelling technique that predicts object extent as well as motion.

FIG. 10A shows a box 1000 to be fitted to points of a moving object cluster. The box 1000 is shown having some position, orientation, and size at time $T_n$. The size is independent of time, but the position and/or orientation may change over time as determined by the twist of the box 1000. A point $r_k$ has been captured at time $t_k=T_n$, from a sensor location $r_{sensor}$. The point $r_k$ has azimuth $\alpha_k$ relative to the radar axis 502. The sensor location $r_{sensor}$ and the orientation of the radar axis 502 may also be time-dependent for a moving ego vehicle.

Figure 10B:
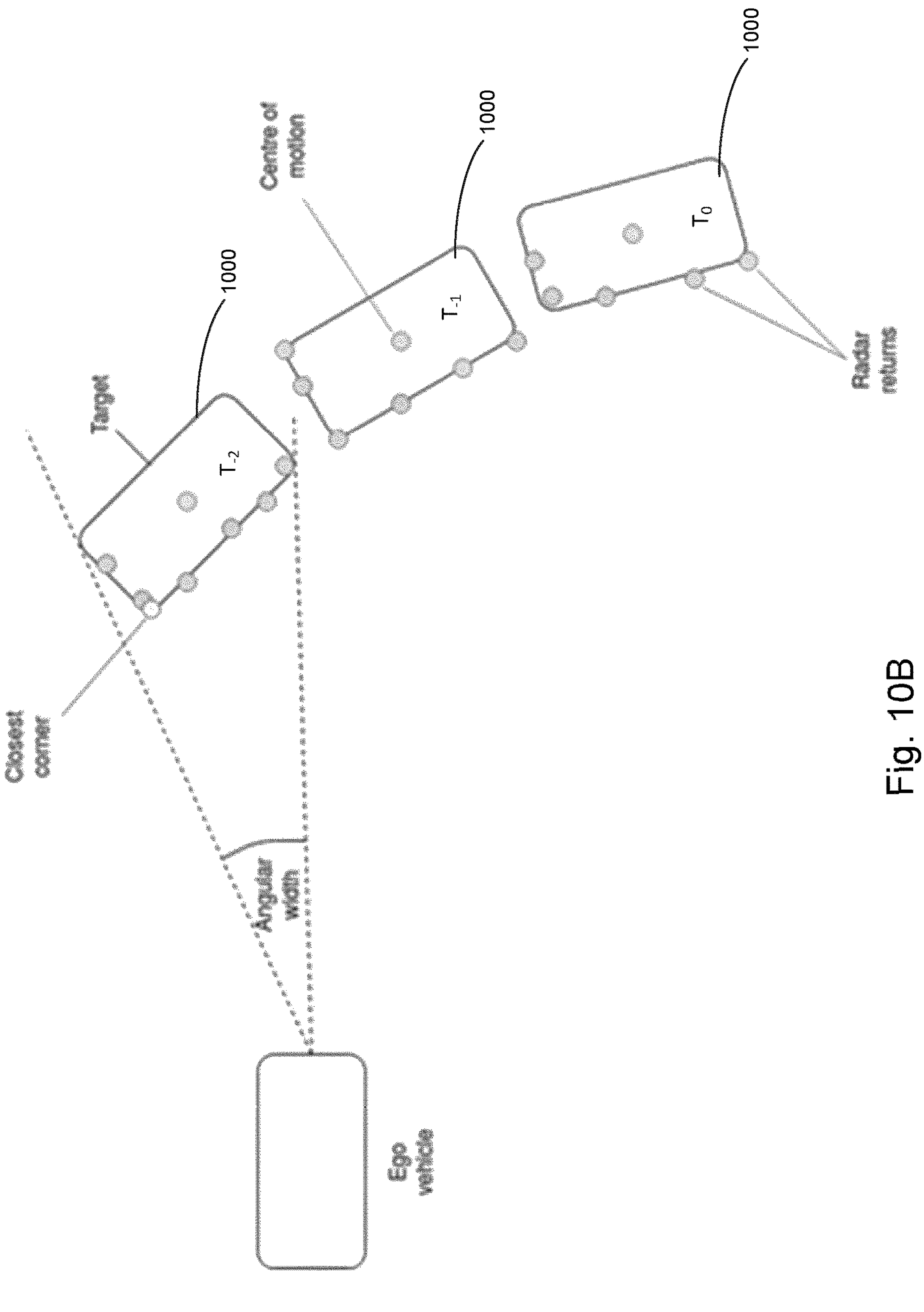

FIG. 10B shows the location and orientation of the box 1000 changing over multiple time steps for some choice of model parameters.

To determine a point on the vehicle that is measured by the radar, i.e., to determine a point on the vehicle corresponding to $r_k$, the following procedure is used:

1. Determine the four corner points of the vehicle, given the box dimensions and a centre of motion position of the box 1000 ($r_{com}$), the orientation at time $t_k$;
2. Determine the velocity of the centre of the box given the motion model parameters.
3. Work out the closest corner to the radar sensor.
4. From this corner:
   1. For each time step $T_n$, work out how many sides of the vehicle should be visible, given the angular width of the target and its orientation and the position $r_{sensor}$ and orientation of the radar sensor at time $T_n$, hence create a function mapping the azimuth onto which side of the box the radar system should be observing. Although only depicted in FIG. 10B for time step $T_{-2}$, these steps are performed for each time step $T_n$ within the accumulation window;
   2. With reference to FIG. 10A, construct a function that maps the azimuth of a point $r_k$ onto a position on the edge of the box, $r_{edge}$. That position is the intersection of a ray 1002 from the sensor location $r_{sensor}$ in the direction of the point's azimuth $\alpha_k$ at time $t_k=T_n$, and the line describing the observed side of the target (i.e., the side of the box determined in step 4.1).
5. Compute a vector from the centre of the box (i.e., the centre of motion) to the edge of the target, $r_{disp}=r_{com}-r_{edge}$.
6. Use the vector $r_{disp}$ to determine a predicted velocity at the edge of the box as $v_{edge}=\mu+\omega\times r_{disp}$. Here, $\mu$ is the linear velocity of the center of mass of the box 1000 at time $T_n$, and $\omega$ the angular velocity at time $T_n$. As noted, these are parameters of the motion model.
7. Project velocity $v_{edge}$ onto the ray 1002 to determine a predicted Doppler measurement.

The above method therefore maps from the independent variables (azimuth, time) to the dependent variables (position, Doppler). An appropriate least-squares (or similar) fit can now be performed to fit the parameters of the model. To address the fact that it is not guaranteed that two edges of the vehicle are seen at all times, the function used in the minimisation can be constructed with the objective of minimising distance of mapped position and Doppler to observations but also minimising the area of the box. The second criterion acts as a constraint to fit the smallest box around our data, and hence provides the assumption the corners of the box 1000 are observed in the accumulated point cloud. This removes remove a flat direction in the fit in the case that only side of the vehicle is observed.

As described above, the fit results can subsequently be used to unsmear the point cloud. Once unsmeared, the second stage processing can be applied to the full unsmeared point cloud exactly as described above. For example, the second stage processing may apply ML bound box detection to the full unsmeared point cloud, and as discussed may be able to provide more accurate and/or more robust results than the first stage.

The unsmeared cluster can also act as a visual verification that the fit procedure works as expected.

In this case, the motion model can be used to determine the change in the orientation of the bounding box 100 between $T_n$ and the reference time $T_0$, as well as the change in its position. In general, the inverse transformation applied to point $r_k$ to account for the object motion may, therefore, involve a combination of translation and rotation.

Alternatively, the box(es) fitted in the first stage and associated motion information can be used as object detection outputs directly in higher-level processing (such as prediction/planning, mapping, annotation etc.), without requiring the second stage processing.

In summary, the extension estimates not only the velocity of the objects, but also the centre of mass position, and its shape. In the two-stage process, this "bounding box" model attempts to infer the size of the target as well as the velocity for the purpose of the unsmearing step.

The centroid method described previously assumes a point target is being tracked, and therefore does not fit the shape. In that case, the centre of mass position is simply estimated as the centroid, leaving only velocity left to calculate in the fit.

The usefulness of bounding box model depends on whether there is enough data in the cluster to be able to reliably fit the bounding box. The centroid fit described previously is the simplest approach suitable for limited data. However, if sufficient data is available in the cluster, it is possible to fit a line (the system sees one complete side of a target), and with more data still it is possible to fit a box (the system sees two sides of the target).

Example Implementation

Figure 11:
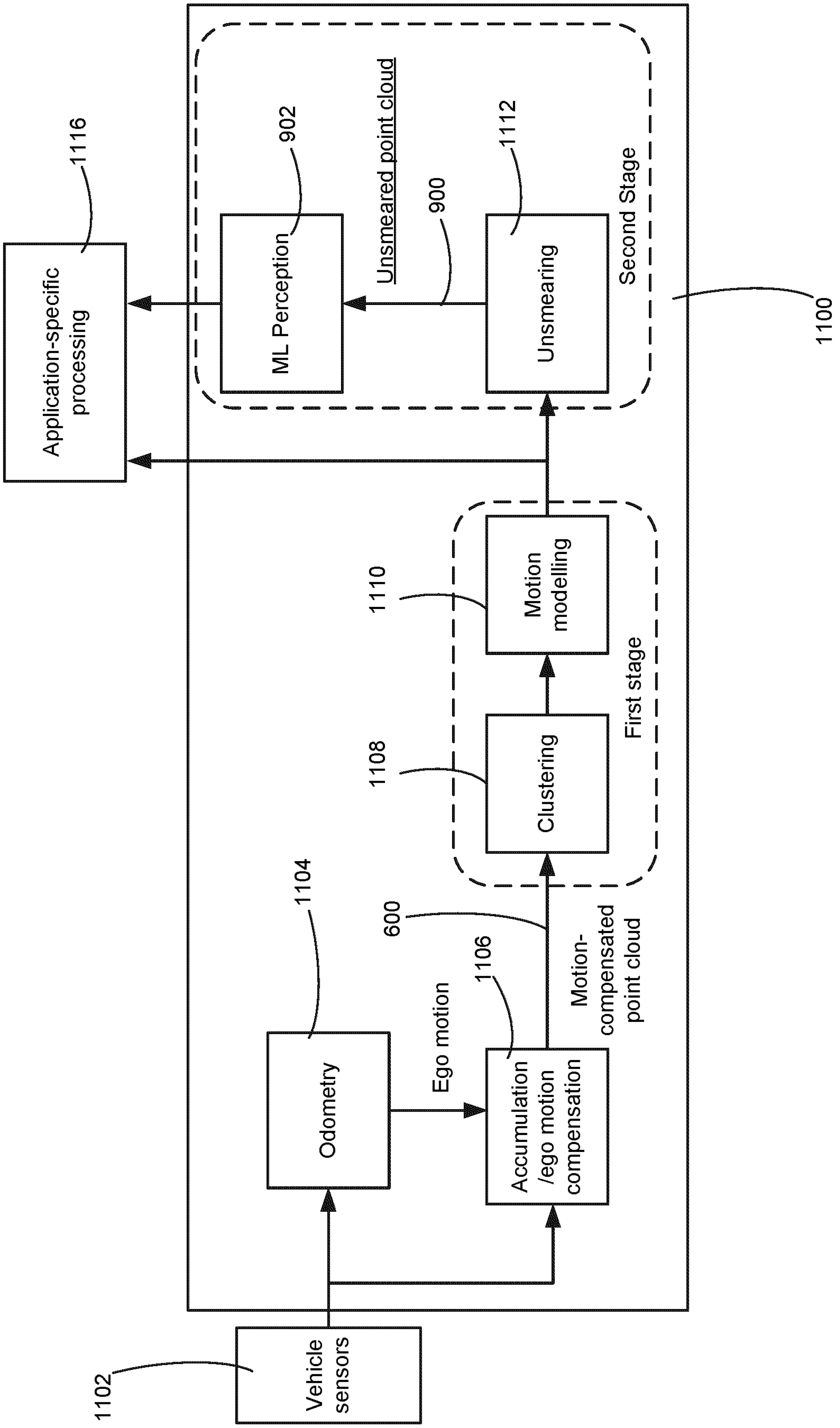
FIG. 11 shows a schematic block diagram of a processing system for implementing the techniques described herein.

FIG. 11 shows a schematic block diagram of a processing system 1100 incorporating the above techniques. The processing system 1102 receives sensor data captured by a sensor system 1102 of a sensor equipped vehicle.

An odometry component 1104 implements one or more odometry methods, in order to track changes in the position and orientation of the ego vehicle to a high degree for accuracy. For example, this may utilize data of one or more inertial sensors of the sensor system 1100 such as IMUs (inertial measurement sensors), accelerometers gyroscopes etc. However, odometry is not limited to the use of IMUs. For example, visual or lidar odometry methods can track changes in ego position/orientation by matching captured image or lidar data to an accurate map of the vehicle's surroundings. Whilst odometry is used in the above examples, more generally any ego localization technique can be used, such as global satellite positioning. A combination of multiple localization and/or odometry techniques may be used.

The output of the odometry component 1104 is used by an ego motion-compensation component 1106 to compensate for ego motion in captured point clouds as described above. As described above, for sparse radar point cloud, the ego motion-compensation component 1106 accumulates radar points, captured over multiple scans, in a common, static frame of reference. In the above example, the result is an accumulated point cloud 600 in 2D or 3D space with ego motion-compensated Doppler values, of the kind depicted in FIG. 6A.

A clustering component 1108 and motion modelling component 1110 implement the clustering and per-cluster motion modelling of the first stage processing, respectively, as set out above. For each cluster, a motion model is determined by fitting one or more parameters of the motion model to the points of that cluster. Generally, this involves the motion model outputting a set of motion predictions (such as predicted positions and/or velocities) that depend on the model parameter(s), and the model parameters are turned by comparing the motion predictions to the points, with the objective of minimizing an overall difference between them.

To implement the second stage, an unsmearing component 1112 uses the output of the motion modelling component 1110 to unsmear moving object points in the accumulated point cloud, and thereby determine an unsmeared point cloud 900 of the kind depicted in FIG. 9C. The unsmeared point cloud 900 is provided to a perception component 902 of the kind described above, such as a trained CNN or other ML component. Perception outputs from the perception component 902 convey extracted information about structure exhibited in the transformed point cloud 900. Examples of perception outputs include 2D or 3D bounding boxes, object locations/orientations, object/scene classification results, segmentation results etc. The perception outputs can then be used for application-specific processing 116.

Alternatively or additionally, motion information from the motion modelling component 110 can be used directly for the application-specific processing 116, as described above.

The sensor data can be received and processed in real-time or non-real time. For example, the processing system 1100 may be an onboard perception system of the ego vehicle that processes the sensor data in real time to provide perception outputs (such as 2D or 3D object detections) to motion planning/prediction etc (examples of application-specific processing 1116). Alternatively, the processing system 1100 may be an offline system that does not necessarily receive or process data in real time. For example, the system 1100 could processes batches of sensor data for in order to provide semi/fully automatic annotation (e.g., for the purpose of training, or extracting scenarios to run in simulation), mapping etc. (further examples of application-specific processing 1116).

Whilst the above examples consider 2D radar point clouds, as noted, the present techniques can be applied to 2D or 3D point clouds of any modality that are accumulated over time, such as lidar or RGBD point clouds etc. The present techniques can also be applied to fused point clouds, obtained by fusing multiple point clouds, e.g., early fused point clouds of different modalities. For lidar point clouds, reflectivity can be used in a similar way to Doppler in radar. For example, in the above method, lidar reflectivity values could be used in the clustering and/or encoded in the input to the perception component 902, for example as in a reflectivity channel of the input tensor 901 in place of the Doppler channel 912.

For any modality of point cloud, a discretised image representation such as the input tensor 901 of FIG. 9D can be used to encode the point cloud for the purpose of object detection or other perception methods. A 2D image representation does not necessarily exclude the presence of explicitly encoded 3D spatial information. For example, a PIXOR representation of a 3D point cloud could encode height values (z dimension) for 3D point clouds in a height channel of the input tensor 900 (not depicted) which is similar to a depth channel of an RGBD image. The input tensor 901 of FIG. 9D is 2D in the sense that it is two-dimensional array of pixels but can have any number of channels (velocity/motion, height etc.).

The present techniques can also be applied to synthetic point cloud data. For example, increasingly simulation is used for the purpose of testing autonomous vehicle components. In that context, components may be tested with sensor-realistic data generated using appropriate sensor models. Note that references herein to point cloud being "captured" in a certain way and the like encompass synthetic point clouds which have been synthesised using sensor model(s) to exhibit substantially the same effects as real sensor data captured in that way.

References herein to components, functions, modules and the like, denote functional components of a computer system which may be implemented at the hardware level in various ways. This includes the components depicted in FIG. 11, which may be implemented by a suitably configured computer system. A computer system comprises one or more computers that may be programmable or non-programmable. A computer comprises one or more processors which carry out the functionality of the aforementioned functional components. A processor can take the form of a general-purpose processor such as a CPU (Central Processing unit) or accelerator (e.g. GPU) etc. or more specialized form of hardware processor such as an FPGA (Field Programmable Gate Array) or ASIC (Application-Specific Integrated Circuit). That is, a processor may be programmable (e.g. an instruction-based general-purpose processor, FPGA etc.) or non-programmable (e.g. an ASIC). Such a computer system may be implemented in an onboard or offboard context.

References may be made to ML perception models, such as CNNs or other neural networks trained to perform perception tasks. This terminology refers to a component (software, hardware, or any combination thereof) configured to implement ML perception techniques. In general, the perception component 902 can be any component configured to recognise object patterns in the transformed point cloud 901. The above considers a bounding box detector, but this is merely one example of a type of perception component that may be implemented by the perception component 902. Examples of perception methods include object or scene classification, orientation or position detection (with or without box detection or extent detection more generally), instance segmentation etc. For an ML object detector 902, the ability to recognize certain patterns in the transformed point cloud 900 is typically learned in training from a suitable training set of annotated examples.

The invention claimed is:

1. A computer-implemented method of perceiving structure in a point cloud captured by a sensor system of an ego vehicle, the method comprising:

applying clustering to the point cloud, and thereby identifying at least one moving object cluster(s) within the point cloud, the point cloud comprising time-stamped points captured over a non-zero accumulation window;

determining a motion model for the moving object cluster, by fitting one or more parameters of the motion model to the time-stamped points of that cluster;

using the motion model to transform the time-stamped points of the moving object cluster to a common reference time to compensate for smearing effects caused by motion of the ego vehicle over the accumulation window; and applying a perception component to the transformed points of the moving object cluster to extract information about structure exhibited in the transformed points.

2. The method of claim 1, wherein the clustering identifies multiple moving object clusters, and a motion model is determined for each of the multiple moving object clusters and used to transform the time-stamped points of that cluster to the common reference time; and wherein the perception component is applied to a transformed point cloud comprising the transformed points of the multiple object clusters to extract information about structure exhibited in the transformed point cloud.

3. The method of claim 2, wherein the transformed point cloud additionally comprises untransformed static object points of the point cloud.

4. The method of claim 1, wherein the clustering is based on timestamps of the time-stamped points, with points assigned to (each of) the moving object cluster(s) based on similarity of their timestamps.

5. The method of claim 4, wherein the clustering is density-based and uses a time threshold to determine whether or not to assign a point to the moving object cluster, wherein the point is assigned to the moving object cluster only if a difference between its timestamp and the timestamp of another point assigned to the moving object cluster is less than the time threshold.

6. The method of claim 1, wherein each point has a velocity component, and the clustering is based on the velocity components, with points assigned to (each of) the moving object cluster(s) based on similarity of their velocity components.

7. The method of claim 6, wherein the clustering is density-based and uses a velocity threshold to determine whether or not to assign a point to the moving object cluster, wherein the point is assigned to the moving object cluster only if a difference between its velocity component and the velocity component of another point assigned to the moving object cluster is less than the velocity threshold.

8. The method of claim 6, wherein the point cloud is a radar point cloud, and the velocity components are Doppler components.

9. The method of claim 6, wherein the velocity components of the (or each) at least one moving object cluster are used to determine the motion model for that cluster.

10. The method of claim 6, wherein the points of the point cloud have been captured by a moving sensor system, wherein ego motion of the sensor system over the accumulation window is determined, and wherein the velocity components are determined by compensating for the ego motion in velocities measured by the moving sensor system.

11. The method of claim 1, wherein the points of the point cloud have been captured by a moving sensor system, wherein ego motion of the sensor system over the accumulation window is determined and used to accumulate the points in a common static frame of reference prior to clustering.

12. The method of claim 1, wherein the perception component is a machine learning (ML) perception component.

13. The method of claim 12, wherein the clustering identifies multiple moving object clusters, and a motion model is determined for each of the multiple moving object clusters and used to transform the time-stamped points of that cluster to the common reference time; and wherein the perception component is applied to a transformed point cloud comprising the transformed points of the multiple object clusters to extract information about structure exhibited in the transformed point cloud and the ML perception component comprises a bounding box detector or other object detector applied to the transformed point cloud, the extracted information comprising object position, orientation and/or size information for at least one detected object.

14. The method of claim 12, wherein the clustering identifies multiple moving object clusters, and a motion model is determined for each of the multiple moving object clusters and used to transform the time-stamped points of that cluster to the common reference time; and wherein the perception component is applied to a transformed point cloud comprising the transformed points of the multiple object clusters to extract information about structure exhibited in the transformed point cloud and the ML perception component is applied to a discretised image representation of the transformed point cloud, the discretised image representation having an occupancy channel indicating whether or not each pixel thereof corresponds to a point in the transformed point cloud.

15. The method of claim 14, wherein the discretised image representation has:

at least one velocity channel that encodes, for each pixel corresponding to a point in the transformed point cloud, a velocity component or a transformed velocity component of that point, or one or more motion channels that encode, for each pixel corresponding to a point of (one of) the moving object cluster(s), motion information about that point derived from the motion model of that moving object cluster.

16. The method of claim 1, wherein the perception component is a machine learning (ML) perception component having a convolutional neural network (CNN) architecture.

17. A computer system for detecting object motion in a point cloud captured by a sensor system of an ego vehicle, the computer system comprising:

at least one memory configured to store computer-readable instructions; and at least one hardware processor coupled to the at least one memory and configured to execute the computer-readable instructions, which upon execution cause the at least one hardware processor to implement operations comprising:

applying clustering to the point cloud, and thereby identifying at least one moving object cluster within the point cloud, the point cloud comprising time-stamped points captured over a non-zero accumulation window;

determining a motion model for the moving object cluster, by fitting one or more parameters of the motion model to the time-stamped points of that cluster;

wherein the point cloud is a radar point cloud, and each point has a measured Doppler component;

wherein the parameters of the motion model comprise linear and angular velocity parameters defining predicted linear and angular velocity of an object in 2D or 3D space; and wherein, for each point of the moving object cluster, a predicted Doppler component is determined from the motion model based on the predicted linear and angular velocity of the object, the linear and angular velocity parameters fitted by comparing the predicted Doppler components with the measured Doppler components; and using the motion model to transform the time-stamped points of the moving object cluster to a common reference time to compensate for smearing effects caused by motion of the ego vehicle over the accumulation window.

18. The computer system of claim 17, wherein the parameters of the motion model comprise one or more extent parameters defining an extent of the object, the predicted Doppler components determined from the motion model based on the extent and linear and angular velocity of the object, the extent parameters and linear and angular velocity parameters fitted by comparing the predicted Doppler components with the measured Doppler components.

19. The computer system of claim 18, wherein the extent parameters are box parameters defining the extent of the object as a 2D or 3D box.

20. A non-transitory computer readable medium embodying computer program instructions, the computer program instructions configured so as, when executed on one or more hardware processors, to implement operations comprising:

applying clustering to a point cloud captured by a sensor system of an ego vehicle, and thereby identifying at least one moving object cluster within the point cloud, the point cloud comprising time-stamped points captured over a non-zero accumulation window;

determining a motion model for the moving object cluster, by fitting one or more parameters of the motion model to the time-stamped points of that cluster;

using the motion model to transform the time-stamped points of the moving object cluster to a common reference time to compensate for smearing effects caused by motion of the ego vehicle over the accumulation window; and applying a perception component to the transformed points of the moving object cluster to extract information about structure exhibited in the transformed points.

* * * * *